(12) United States Patent
Hosaka et al.

(10) Patent No.: US 8,300,972 B2
(45) Date of Patent: Oct. 30, 2012

(54) ELECTRONIC APPARATUS, BLUR IMAGE SORTING METHOD, AND PROGRAM

(75) Inventors: Hisashi Hosaka, Tokyo (JP); Kosuke Kimura, Tokyo (JP); Kuniichiro Naruse, Tokyo (JP); Kazuma Igari, Kanagawa (JP); Sadamichi Bamba, Kanagawa (JP); Yukiko Akiyama, Tokyo (JP); Mitsuo Okumura, Tokyo (JP); Akira Kikuchi, Kanagawa (JP); Hidefumi Kashima, Tokyo (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 12/775,132

(22) Filed: May 6, 2010
(Under 37 CFR 1.47)

(65) Prior Publication Data
US 2011/0116726 A1    May 19, 2011

Related U.S. Application Data

(63) Continuation of application No. 12/564,658, filed on Sep. 22, 2009, now abandoned.

(30) Foreign Application Priority Data

Sep. 24, 2008 (JP) ................................. 2008-244816

(51) Int. Cl.
*G06K 9/40*    (2006.01)
(52) U.S. Cl. ........................................................ 382/255
(58) Field of Classification Search ..................... 382/255
See application file for complete search history.

(56) References Cited

U.S. PATENT DOCUMENTS

| | | | |
|---|---|---|---|
| 2009/0091633 A1* | 4/2009 | Tamaru | 348/208.14 |
| 2009/0284645 A1* | 11/2009 | Nozaki et al. | 348/349 |

FOREIGN PATENT DOCUMENTS

| | | |
|---|---|---|
| JP | 2000-148980 | 5/2000 |
| JP | 2000-350123 | 12/2000 |
| JP | 2004-362443 | 12/2004 |
| JP | 2005-332382 | 12/2005 |
| JP | 2006-50494 | 2/2006 |
| JP | 2006-115289 | 4/2006 |
| JP | 2007-251338 | 9/2007 |
| JP | 2007-323509 | 12/2007 |

* cited by examiner

*Primary Examiner* — Jingge Wu
*Assistant Examiner* — Nirav G Patel
(74) *Attorney, Agent, or Firm* — Oblon, Spivak, McClelland, Maier & Neustadt, L.L.P.

(57) ABSTRACT

An electronic apparatus includes: an extraction section extracting a subject area having a predetermined feature in an image; a first calculation section calculating a first blur degree indicating a blur degree of the extracted subject area; a second calculation section calculating, when the number of subject areas from which the first blur degree is calculated is one, a second blur degree indicating a blur degree of the entire image based on the first blur degree, and calculating, when the number of subject areas from which the first blur degree is calculated is plural, the second blur degree based on a value obtained by performing weighted averaging on the plural first blur degrees in accordance with dimensions of the plural subject areas; and a sorting section sorting an image having the calculated second blur degree equal to or larger than a predetermined threshold value, as a blur image, from plural images.

11 Claims, 11 Drawing Sheets

$$\text{Image blur index} = \frac{((B1 \times S1 \times D1) + (B2 \times S2 \times D2) + ... + (Bn \times Sn \times Dn))}{((S1 \times D1) + (S2 \times D2) + ... + (Sn \times Dn)) \times 10}$$

- $Bn$ : Area blur index of subject area n
- $Sn$ : Dimension of subject area n
- $Dn$ : Score of subject area n
  (feature recognition score is acquired value, face recognition score is fixed to 1)

Press of blur image sorting button

ELECTRONIC APPARATUS, BLUR IMAGE SORTING METHOD, AND PROGRAM

CROSS REFERENCE TO RELATED APPLICATIONS

This application is a Continuation of and is based upon and claims the benefit of priority under 35 U.S.C. §120 for U.S. Ser. No. 12/564,658 filed Sep. 22, 2009, the entire contents of which is incorporated herein by reference. U.S. Ser. No. 12/564,568 claims the benefit of priority under 35 U.S.C. §119 from Japanese Patent Application No. 2008-244816 filed Sep. 24, 2008.

BACKGROUND OF THE INVENTION

1. Field of the Invention

The present invention relates to an electronic apparatus capable of storing and outputting a plurality of still images, a blur image sorting method in the electronic apparatus, and a program.

2. Description of the Related Art

In the past, there have been electronic apparatuses having an album creation function for organizing images such as pictures that have been photographed and stored and a slide-show function for images. In a case where these functions are executed by an electronic apparatus, a user needs to select desired images to be stored or displayed, but it is hard for the user to sort desired images from a large amount of images.

In this regard, as a technique of selecting a so-called best shot, that is, an image that is presumed to be worth being viewed by a user, from a plurality of images, there is known a technique of selecting a best shot from a plurality of images obtained by continuous photographing (see, for example, Japanese Patent Application Laid-open No. 2006-311340; hereinafter, referred to as Patent Document 1).

Further, a technique of evaluating quality of an image as a picture based on sharpness of an image, quality of an image of a face, and presence/absence of flare is also known (see, for example, Japanese Patent Translation Publication No. 2005-521927; hereinafter, referred to as Patent Document 2). Moreover, a technique of detecting a face from an image and selecting and clipping out an optimum composition in accordance with the detection result is also known (see, for example, Japanese Patent Application Laid-open No. 2007-27971; hereinafter, referred to as Patent Document 3).

SUMMARY OF THE INVENTION

However, in the techniques described above, it is difficult to reliably evaluate an evaluation target image as to whether or not the image is presumed to be worth being viewed by a user, that is, whether or not a subject of the image is blurry, and then sort it.

For example, in the technique of selecting a best shot from images obtained by continuous photographing, the technique being described in Patent Document 1, a blur degree in the entire image and an exposure are evaluated. However, even when the evaluation of a blur degree and an exposure is performed on normal images that are not obtained by continuous photographing, blurry images cannot be always sorted. In other words, generally, a picture in which a subject is in focus and a background is blurry may be a well-photographed shot, or a so-called best shot, because the subject is photographed clearly. However, when the technique of Patent Document 1 is used for images that are not obtained by continuous photographing, there is a risk that an image in which a subject is in focus but a background is blurry is judged to be a blurry image.

In the technique described in Patent Document 2, quality of an image is evaluated assuming that a subject is a human face, and in a case where a face is not detected from the image, quality of the image is evaluated based on presence/absence of sharpness and flare. Accordingly, in such a case as well, an image in which a subject is in focus but a background is blurry is judged to be a blurry image.

In addition, in the technique described in Patent Document 3, an optimum composition can be clipped out, but it is difficult to evaluate whether or not an image is blurry. In this technique, in a case where a human face does not exist in the image as a subject, it may be impossible to clip out an optimum composition.

In view of the above-mentioned circumstances, there is a need for an electronic apparatus, a blur image sorting method, and a program that are capable of reliably sorting out images unnecessary for a user, in which subjects to attract attention are blurry.

According to an embodiment of the present invention, there is provided an electronic apparatus including an extraction means, a first calculation means, a second calculation means, and a sorting means.

The extraction means extracts, from an image, a subject area having a predetermined feature in the image.

The first calculation means calculates a first blur degree that indicates a blur degree of the extracted subject area.

The second calculation means calculates, when the number of subject areas in the image from which the first blur degree is calculated is one, a second blur degree that indicates a blur degree of the entire image based on the first blur degree. Further, the second calculation means calculates, when the number of subject areas in the image from which the first blur degree is calculated is plural, the second blur degree based on a value obtained by performing weighted averaging on the plurality of first blur degrees in accordance with dimensions of the plurality of subject areas.

The sorting means sorts an image having the calculated second blur degree that is equal to or larger than a predetermined threshold value, as a blur image, from a plurality of images.

With this structure, by calculating the blur degree (first blur degree) of the subject area in the image and the blur image (second blur image) of the entire image based on the dimension of the subject area, the electronic apparatus can sort the blur image from the plurality of images. A subject having the predetermined feature is various things including people, animals, plants, and buildings. The first blur degree is calculated by edge intensities within the subject area, for example. A subject area having the predetermined feature is an area that attracts attention of a viewer of the image. That is, when the area that attracts attention is one, the electronic apparatus calculates a blur degree of the entire image based on a blur degree of the area. Further, when there are a plurality of areas that attract attention, the electronic apparatus calculates a blur degree of the entire image by performing weighted averaging on blur degrees of the respective areas in accordance with dimensions of the respective areas. This is because a larger dimension is more likely to attract attention. By such processing, the electronic apparatus can calculate a blur degree of an image accurately and sort out blur images unnecessary for a user. The user can delete the blur images and remove them from materials for an original movie or the like in accordance with the sorting result. Accordingly, convenience for the user is improved.

The electronic apparatus may further include an optimization means for optimizing the extracted subject area so that the extracted subject area will have a predetermined size adequate to a calculation of the first blur degree.

Here, the optimization refers to size reduction of an area that is so large that it takes a long time to calculate the first blur degree, and removal of an area that is too small to calculate the first blur degree accurately. With this optimization, the electronic apparatus can calculate the first blur degree more accurately, and as a result, can calculate the second blur degree more accurately.

The extraction means may calculate a score that indicates a certainty of extraction of the subject area.

In this case, the second calculation means may calculate, when the number of subject areas in the image from which the first blur degree is calculated is plural, the second blur degree based on a value obtained by performing weighted averaging on the plurality of first blur degrees in accordance with the dimensions of the plurality of subject areas and the calculated score.

Here, the score is an evaluation value that indicates a degree of a feature of a subject area, the feature including brightness, a color, an edge (direction), and a face, compared with other areas. It is considered that as the score becomes larger, a subject area of the score is more likely to attract attention of a viewer. In a case where the first blur degrees are calculated from the plurality of subject areas, the electronic apparatus performs weighted averaging on the first blur degrees in accordance with the score, in addition to the dimensions of the plurality of subject areas. Accordingly, it is possible to calculate the second blur degree more accurately, and sort out the blur image more accurately.

Further, the extraction means may include a face recognition means and a feature recognition means.

The face recognition means recognizes a face area of a human face as the subject area and calculates a first score that indicates the score of the recognized face area.

The feature recognition means recognizes a feature area that is visually salient as the subject area and calculates a second score that indicates the score of the recognized feature area.

In a case where the number of subject areas in the image from which the first blur degree is calculated is plural, the second calculation means may calculate the second blur degree without using the first score in the weighted averaging when the face area is recognized as the subject area by the face recognition means. Further, the second calculation means may calculate the second blur degree using the second score in the weighted averaging when the feature area is recognized as the subject area by the feature recognition means.

In this structure, when a plurality of faces are recognized as the subject areas, the electronic apparatus calculates the second blur degree by performing weighted averaging on the first blur degrees in accordance with only the dimensions of the face areas. On the other hand, when a plurality of feature areas are recognized as the subject areas, the electronic apparatus calculates the second blur degree by performing weighted averaging on the first blur degrees in accordance with the dimensions of the areas and the scores of the areas. That is, when the extracted subject areas are face areas, the electronic apparatus performs weighted averaging in accordance with only the dimensions, irrespective of the scores of the faces, and when the extracted subject areas are feature areas, the electronic apparatus performs weighted averaging in accordance with the scores of the feature areas in addition to the dimensions thereof. A difference is provided in the processing in this manner because it is considered that the face area attracts more attention of a viewer unconditionally than the feature area. Accordingly, the electronic apparatus distinguishes an area that attracts attention in an image more accurately and performs operations so that a blur degree of the entire image becomes higher as the area that attracts attention is more blurry, with the result that the electronic apparatus can calculate the blur degree of the entire image more accurately.

The first calculation means may calculate the first blur degree with the entire image as the subject area when no subject area is extracted.

Accordingly, even when the area that attracts attention is absent in the image, the electronic apparatus can calculate the blur degree of the entire image by regarding the entire image as a subject area.

The electronic apparatus may further include an operation reception means for receiving an operation of a user, and a display means for displaying the plurality of images.

In this case, the sorting means may sort out the blur image in accordance with a predetermined operation of the user.

In this case, the display means may display only the sorted blur image out of the plurality of displayed images when the predetermined operation is received.

Accordingly, only by executing the predetermined operation, the user can sort out and view only the blur image from the plurality of images, and delete and remove the unnecessary blur image with ease. The predetermined operation refers to a GUI such as icons of buttons, but is not limited thereto.

According to another embodiment of the present invention, there is provided a blur image sorting method that includes extracting, from an image, a subject area having a predetermined feature in the image.

In this method, a first blur degree that indicates a blur degree of the extracted subject area is calculated.

When the number of subject areas in the image from which the first blur degree is calculated is one, a second blur degree that indicates a blur degree of the entire image is calculated based on the first blur degree. When the number of subject areas in the image from which the first blur degree is calculated is plural, the second blur degree is calculated based on a value obtained by performing weighted averaging on the plurality of first blur degrees in accordance with dimensions of the plurality of subject areas.

Then, an image having the calculated second blur degree that is equal to or larger than a predetermined threshold value is sorted as a blur image from a plurality of images.

According to this method, it is possible to calculate a blur degree of an image reliably and sort out a blur image unnecessary for a user.

According to still another embodiment of the present invention, there is provided a blur image sorting method that includes optimizing a subject area having a predetermined feature, that is extracted from an image so that the subject area will have a predetermined size.

In this method, a first blur degree that is calculated from the optimized subject area and indicates a blur degree of the subject area is acquired.

When the number of subject areas in the image from which the first blur degree is calculated is one, a second blur degree that indicates a blur degree of the entire image is calculated based on the first blur degree. Further, when the number of subject areas in the image from which the first blur degree is calculated is plural, the second blur degree is calculated based on a value obtained by performing weighted averaging on the plurality of first blur degrees in accordance with dimensions of the plurality of subject areas.

Then, an image having the calculated second blur degree that is equal to or larger than a predetermined threshold value is sorted as a blur image from a plurality of images.

According to this method, by optimizing the size of each of extracted subject areas and calculating a blur degree of the entire image based on blur degrees calculated from the subject areas, a blur image can be sorted out reliably.

According to still another embodiment of the present invention, there is provided a program causing an electronic apparatus to execute an extraction step, a first calculation step, a second calculation step, and a sorting step.

In the extraction step, a subject area having a predetermined feature in an image is extracted from the image.

In the first calculation step, a first blur degree that indicates a blur degree of the extracted subject area is calculated.

In the second calculation step, when the number of subject areas in the image from which the first blur degree is calculated is one, a second blur degree that indicates a blur degree of the entire image is calculated based on the first blur degree. Further, in the second calculation step, when the number of subject areas in the image from which the first blur degree is calculated is plural, the second blur degree is calculated based on a value obtained by performing weighted averaging on the plurality of first blur degrees in accordance with dimensions of the plurality of subject areas.

In the sorting step, an image having the calculated second blur degree that is equal to or larger than a predetermined threshold value is sorted as a blur image from a plurality of images.

According to this program, it is possible to calculate a blur degree of an image accurately and sort out a blur image unnecessary for a user.

According to still another embodiment of the present invention, there is provided a program causing an electronic apparatus to execute an optimization step, an acquisition step, a calculation step, and a sorting step.

In the optimization step, a subject area having a predetermined feature, that is extracted from an image so that the subject area will have a predetermined size is optimized.

In the acquisition step, a first blur degree that is calculated from the optimized subject area and indicates a blur degree of the subject area is acquired.

In the calculation step, when the number of subject areas in the image from which the first blur degree is calculated is one, a second blur degree that indicates a blur degree of the entire image is calculated based on the first blur degree. Further, in the calculation step, when the number of subject areas in the image from which the first blur degree is calculated is plural, the second blur degree is calculated based on a value obtained by performing weighted averaging on the plurality of first blur degrees in accordance with dimensions of the plurality of subject areas.

In the sorting step, an image having the calculated second blur degree that is equal to or larger than a predetermined threshold value is sorted as a blur image from a plurality of images.

According to this program, by optimizing the size of each of extracted subject areas and calculating a blur degree of the entire image based on blur degrees calculated from the subject areas, a blur image can be sorted out reliably.

According to still another embodiment of the present invention, there is provided an electronic apparatus including an extraction section, a first calculation section, a second calculation section, and a sorting section.

The extraction section extracts, from an image, a subject area having a predetermined feature in the image.

The first calculation section calculates a first blur degree that indicates a blur degree of the extracted subject area.

The second calculation section calculates, when the number of subject areas in the image from which the first blur degree is calculated is one, a second blur degree that indicates a blur degree of the entire image based on the first blur degree, and calculates, when the number of subject areas in the image from which the first blur degree is calculated is plural, the second blur degree based on a value obtained by performing weighted averaging on the plurality of first blur degrees in accordance with dimensions of the plurality of subject areas.

The sorting section sorts an image having the calculated second blur degree that is equal to or larger than a predetermined threshold value, as a blur image, from a plurality of images.

As described above, according to the embodiments of the present invention, it is possible to reliably sort out images unnecessary for a user, in which subjects that attract attention are blurry.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Hardware Configuration of PC)

Figure 1:
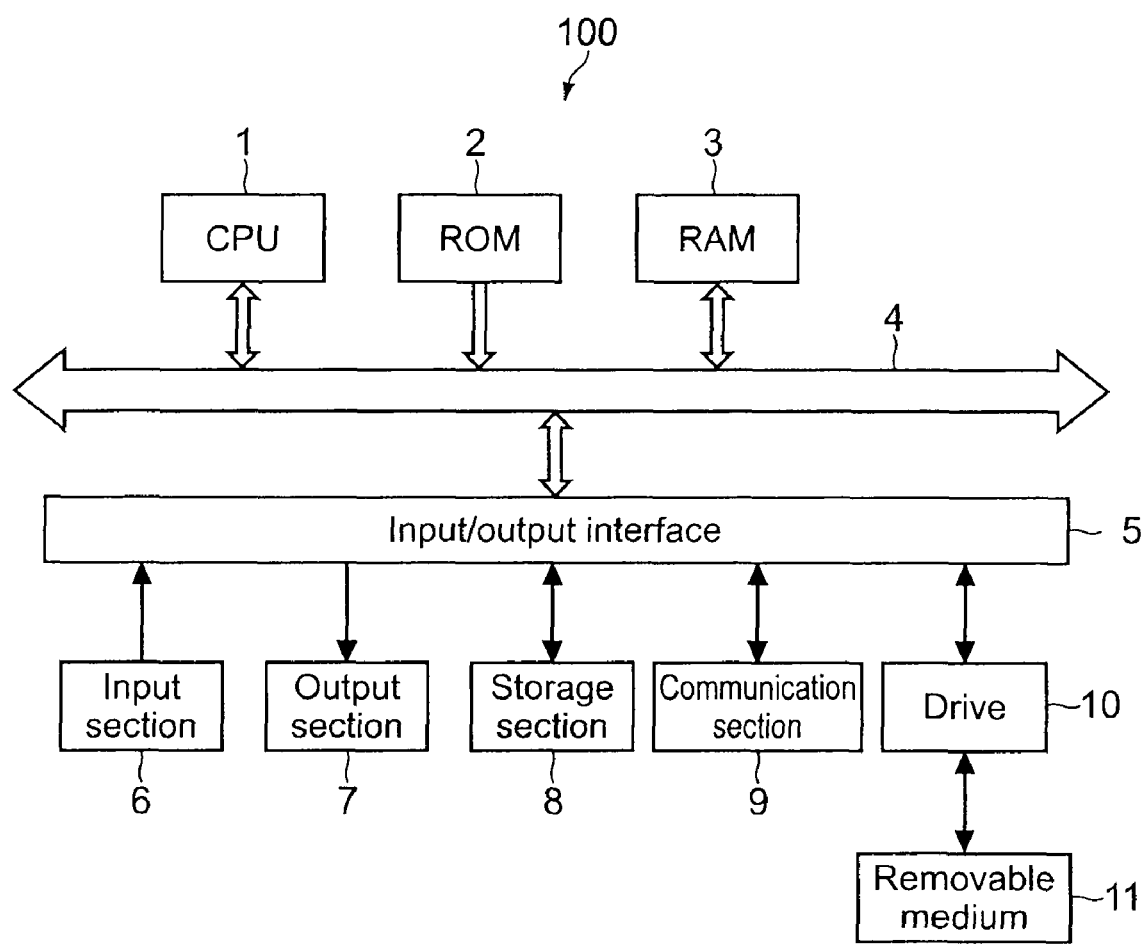
FIG. 1 is a diagram showing a hardware configuration of a PC according to an embodiment of the present invention.

FIG. 1 is a diagram showing a hardware configuration of a PC according to an embodiment of the present invention.

As shown in FIG. 1, a PC 100 includes a CPU (Central Processing Unit) 1, a ROM (Read Only Memory) 2, and a RAM (Random Access Memory) 3, and these are connected to each other by a bus 4.

The PC 100 further includes an input/output (I/O) interface 5, an input section 6, an output section 7, a storage section 8, a communication section 9, and a drive 10. In the PC 100, the input section 6, the output section 7, the storage section 8, the communication section 9, and the drive 10 are connected to the I/O interface 5.

The CPU 1 accesses the RAM 3 and the like as necessary and controls the whole block of the PC 100 collectively while performing various operations. The ROM 2 is a nonvolatile memory that fixedly stores an OS, programs, firmware such as various parameters executed by the CPU 1. The RAM 3 is used as a working area or the like for the CPU 1 and temporarily stores the OS, various programs being executed, and various pieces of data being processed.

The input section 6 is a keyboard, a mouse, a touchpad, a button, or the like, and receives various operations of a user and outputs input operation signals to the CPU 1. The output section 7 is a display section such as an LCD (Liquid Crystal Display) and an OEL (Organic Electro-Luminescence) display that outputs video signals of various contents, and a speaker that outputs audio signals of various contents.

The storage section 8 is, for example, a nonvolatile memory such as an HDD and a flash memory. The storage section 8 stores the OS, various programs and applications, and various pieces of data in its built-in hard disk or a memory device. Further, the storage section 8 reads those programs and pieces of data to the RAM 3.

Particularly in this embodiment, the storage section 8 stores a movie creation application. The storage section 8 also stores moving image files, still image files, and music files that become materials for creating movies, and created movie files. The movie creation application is an application for creating a user's own original moving image (movie) using as materials the moving image files and the still image files containing images that have been shot by the user and stored in the storage section 8, and the music files. Specifically, the movie creation application creates a movie by inserting moving images or still images selected by the user into a template having a predetermined moving image frame, still image frame, or the like, and combining the images as a file.

The communication section 9 includes, for example, a network interface card and a modem and communicates with other equipment via a network such as the Internet. For example, the communication section 9 can receive programs and data from other equipment via the network.

The drive 10 loads a removable medium 11 to read programs and data recorded on the removable medium 11, and stores them in the storage section 8 or reproduces them by the output section 7 via the I/O interface 5.

The removable medium 11 is a medium including optical discs such as a DVD, a BD, and a CD, and semiconductor memories such as a memory card.

(Function of Movie Creation Application)

Figure 2:
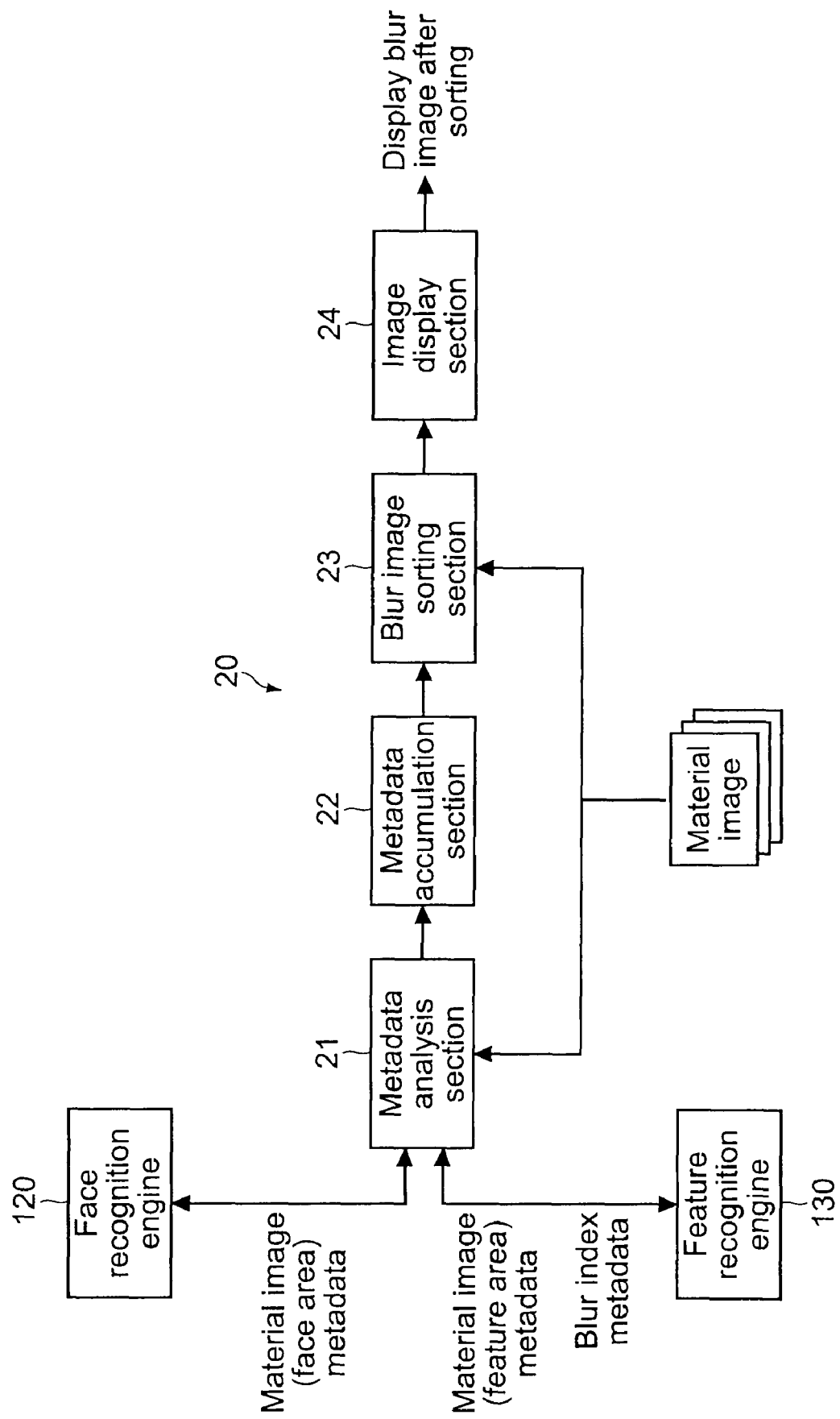
FIG. 2 is a diagram for describing an image sorting function of the PC according to the embodiment of the present invention.

The movie creation application has a function of sorting, before creating a movie, blurry images (hereinafter, referred to as blur image) that are unnecessary for the user and hardly become materials for a movie from a plurality of still images stored in the storage section 8. The blur image sorting function will be described below. FIG. 2 is a diagram for describing the blur image sorting function.

As shown in FIG. 2, a movie creation application 20 includes a metadata analysis section 21, a metadata accumulation section 22, a blur image sorting section 23, and an image display section 24. Further, the PC 100 stores a face recognition engine 120 and a feature recognition engine 130 as external engines of the movie creation application 20.

The face recognition engine 120 recognizes a human face as a subject area from a material image given by the movie creation application 20 and extracts a rectangular area (face area) including the human face. Then, the face recognition engine 120 outputs, to the movie creation application 20, metadata including data of the face area, its size information (height, width, tilt), a face recognition score indicating a certainty of recognition, and the like.

Various known techniques are used as a face recognition technique in the face recognition engine 120. For example, the face recognition engine 120 may recognize a feature of a face using a feature filter. The feature filter is such a filter that detects a certain part of a rectangle in an image and masks a different part of the rectangle. By the feature filter, positional relationships among eyes, eyebrows, a nose, cheeks, and the like of a face are detected as facial features from an image including the face, and shapes of objects except a face and positional relationships between constituent elements of the objects are detected as non-facial features from an image not including a face. The face recognition engine 120 filters images by the feature filter while changing a size and a position of a frame of the feature filter. Then, the face recognition engine 120 recognizes the size of the feature filter obtained when a most certain detection value is acquired as a size of a face area and extracts the face area. As the feature filter, in addition to the rectangular filter, there may be used a separability filter that detects circular features and a Gabor filter that detects positional relationships of facial parts by edges in specific directions. Moreover, as the face recognition technique, for example, brightness distribution information and skin tone information in an image may be used in addition to the features filter.

The feature recognition engine 130 has a feature area recognition function and a blur recognition function. The feature area recognition function recognizes and extracts a feature area that is visually salient as a subject area from an image given by the movie creation application 20. The blur recognition function determines a blur degree in the given image.

As the feature area recognition function, the feature recognition engine 130 recognizes features of the given image to generate feature maps and then integrates the feature maps to generate a saliency map, thus recognizing and extracting a rectangular feature area. The recognized features include a brightness feature, a color feature, and an edge (direction) feature. The feature recognition engine 130 generates a brightness map, a color map, and an edge map from the brightness feature, the color feature, and the edge feature of the image, respectively, and these maps are subjected to linear combination to generate a saliency map. Then, the feature recognition engine 130 extracts a rectangular feature area based on the saliency map, and outputs, to the movie creation application 20, metadata including data of the extracted feature area, its size information (height, width, tilt), a feature recognition score indicating a certainty of recognition, and the like.

Further, as the blur recognition function, the feature recognition engine 130 extracts an edge point from the given face area and feature area using the saliency map as necessary, and analyzes the edge point to thereby calculate blur indexes of the respective areas. Then, the feature recognition engine 130 outputs the calculated blur indexes to the movie creation application 20.

The metadata analysis section 21 includes a face recognition plug-in and a feature recognition plug-in that cooperate with the face recognition engine 120 and the feature recognition engine 130, respectively. The metadata analysis section 21 supplies a material image (still image) to the face recognition engine 120 and the feature recognition engine 130, and acquires metadata regarding a face area and a feature area of the material image. Moreover, the metadata analysis section 21 processes the acquired face area and feature area to an adequate size for blur recognition processing and then supplies them to the feature recognition engine 130, to thereby calculate a blur index of the entire image based on the blur indexes obtained as a result of the blur recognition. Hereinafter, the blur index of each of the face area and the feature area that is calculated by the feature recognition engine 130 will be referred to as area blur index, and the blur index of the entire image that is calculated by the metadata analysis section 21 will be referred to as image blur index.

The metadata accumulation section 22 accumulates metadata regarding the face area and the feature area acquired from the face recognition engine 120 and the feature recognition engine 130. The metadata accumulation section 22 also accumulates the image blur index calculated by the metadata analysis section 21.

The blur image sorting section 23 sorts, based on the blur indexes described above, blur images from a plurality of material images in accordance with an operation of the user. The image display section 24 displays a list of the plurality of material images and, in accordance with an operation of the user, displays only the blur images sorted out by the blur image sorting section 23.

(Operation of PC)

Next, an operation of the PC 100 thus configured will be described. Hereinafter, each software of the movie creation application 20, the face recognition engine 120, and the feature recognition engine 130 will be described as a main constituent of the operation, but the whole operation is executed under control of hardware such as the CPU 1 and the like.

(Outline of Operation of Metadata Analysis Section)

Figure 3:
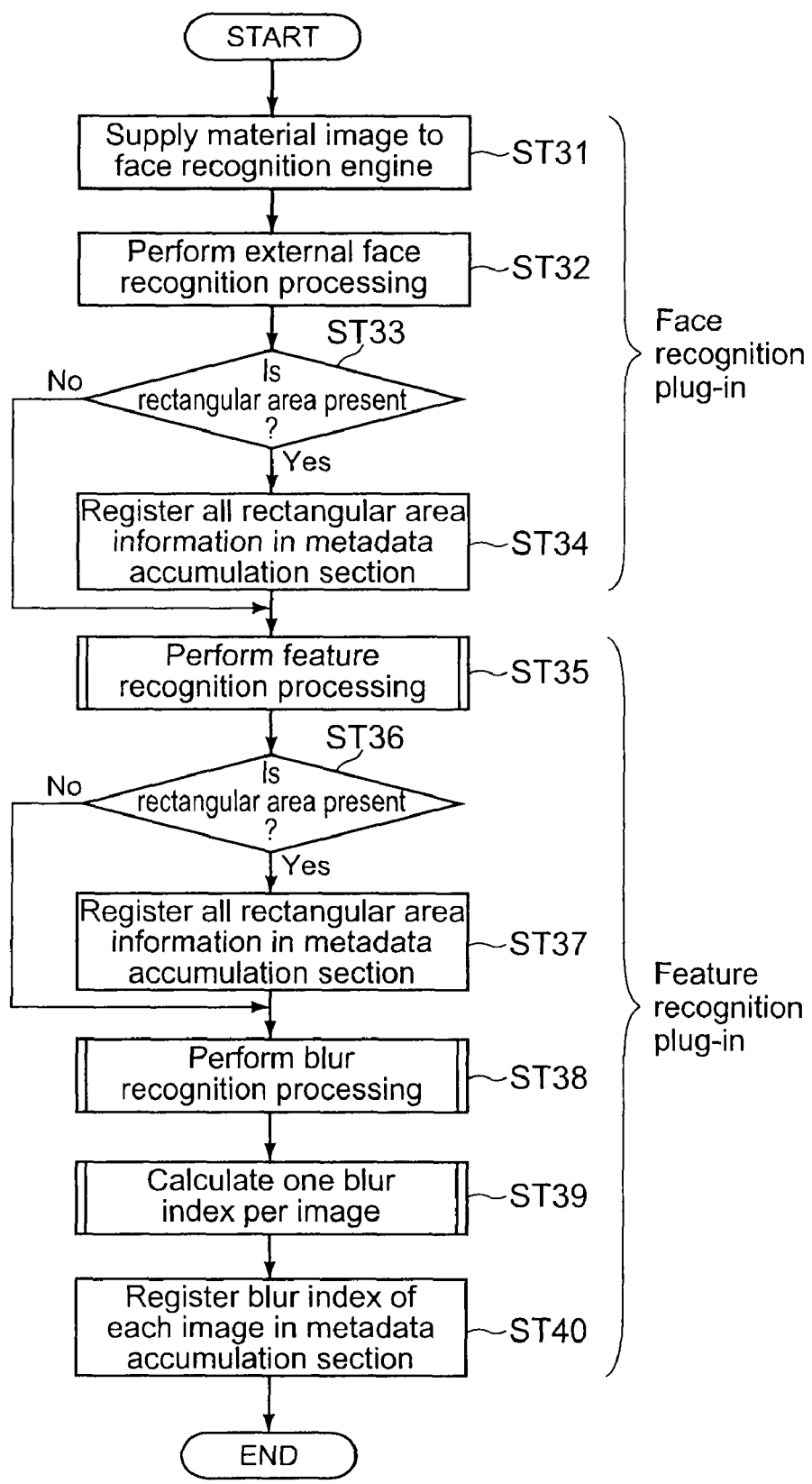
FIG. 3 is a flowchart showing a rough operation flow of a metadata analysis section of the PC according to the embodiment of the present invention.

FIG. 3 is a flowchart showing a rough operation flow of the metadata analysis section 21 in this embodiment.

As shown in FIG. 3, first, the face recognition plug-in of the metadata analysis section 21 supplies a material image accumulated in the storage section 8 to the face recognition engine 120 (Step 31).

The face recognition engine 120 executes face recognition processing with respect to the input material image, and as a result of the processing, outputs respective metadata such as data of an extracted face area, a size of the face area, and a face recognition score to the face recognition plug-in (Step 32).

The face recognition plug-in judges whether a rectangular area is present in the metadata supplied from the face recognition engine 120 (Step 33). If a rectangular area is present (Yes), the face recognition plug-in registers all the metadata on the rectangular area in the metadata accumulation section 22 (Step 34).

Next, the feature recognition plug-in cooperates with the feature recognition engine 130 to execute feature recognition processing using the material image (Step 35). The feature recognition processing will be described later in detail.

Subsequently, the feature recognition plug-in judges whether a rectangular area is present in the metadata supplied from the feature recognition engine 130 by the feature recognition processing (Step 36). If a rectangular area is present (Yes), the feature recognition plug-in registers all the metadata on the rectangular area in the metadata accumulation section 22 (Step 37).

The feature recognition plug-in then supplies the rectangular area registered in the metadata accumulation section 22 to the feature recognition engine 130, and executes the blur recognition processing on the rectangular area (Step 38). The blur recognition processing will also be described later in detail.

The feature recognition plug-in calculates, based on a result of the blur recognition processing, an image blur index per image (entire image) (Step 39). This processing will also be described later in detail. The feature recognition plug-in then registers the calculated image blur index of each material image in the metadata accumulation section 22 (Step 40).

(Feature Recognition Processing of Metadata Analysis Section)

Figure 4:
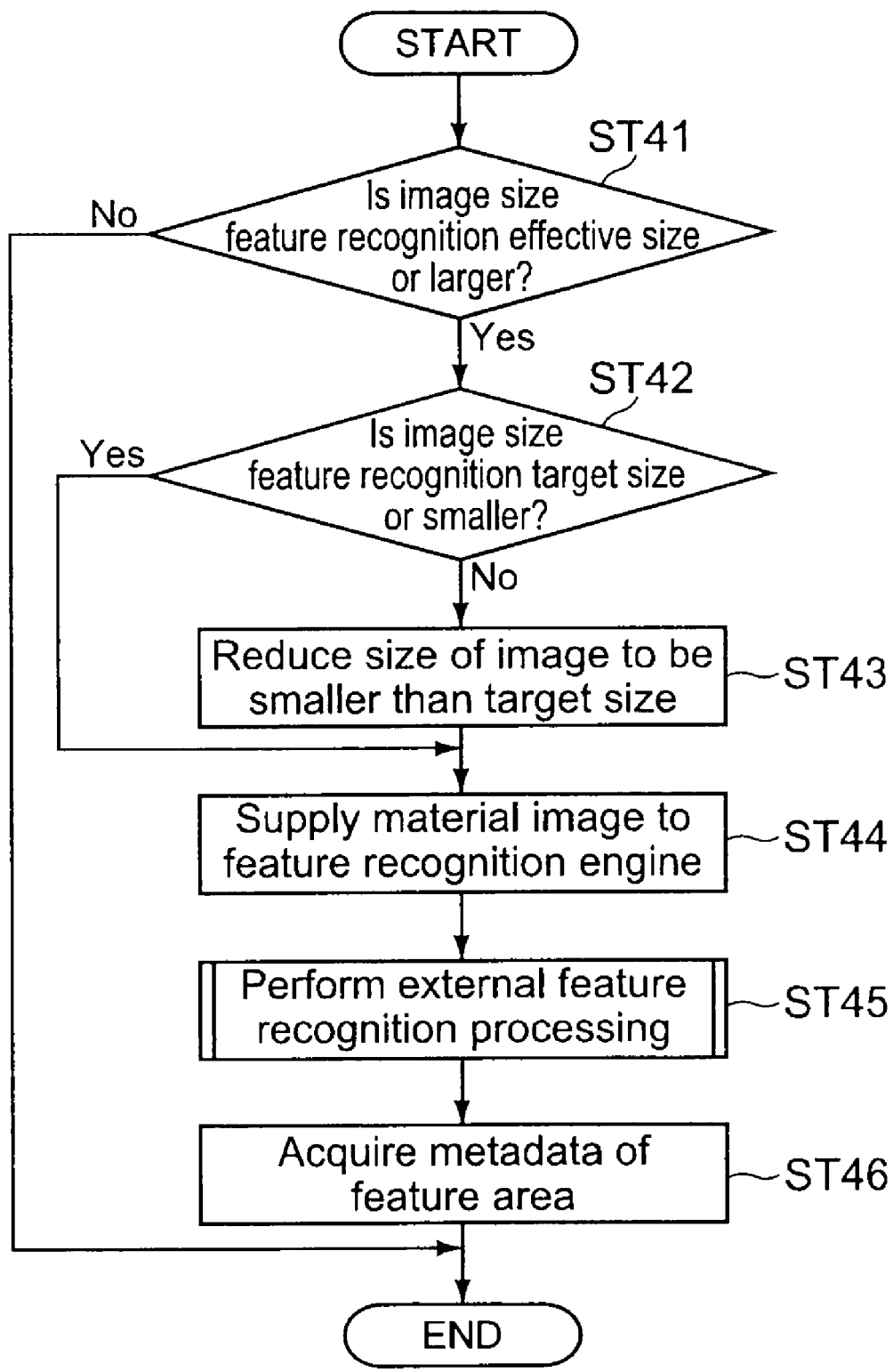
FIG. 4 is a flowchart showing a flow of feature recognition processing in the embodiment of the present invention.

FIG. 4 is a flowchart showing in detail a flow of feature recognition processing in Step 35 described above.

As shown in FIG. 4, the feature recognition plug-in first judges whether a size of the material image acquired from the storage section 8 is equal to or larger than a minimum effective size in the feature recognition processing by the feature recognition engine 130 (Step 41). The minimum effective size is, for example, 256×256 (pixels), but is not limited thereto. In this processing, it is judged whether the material image is large enough to tolerate the feature recognition processing.

After that, the feature recognition plug-in judges whether the size of the material image is equal to or smaller than a maximum analysis object size in the feature recognition processing by the feature recognition engine 130 (Step 42). The maximum analysis object size is, for example, 3,200×3,200 (pixels), but is not limited thereto. In a case where the size of the material image is above the maximum analysis object size (No), the feature recognition plug-in reduces the size of the material image so that it becomes a size equal to or smaller than the maximum analysis object size (Step 43). The reason for the size reduction of the material image is as follows. In a case where a material image has a size equal to or larger than the maximum analysis object size, the feature recognition engine 130 can perform the feature recognition processing itself but it takes too long a time to complete the processing. In other words, by the reduction processing, the processing load on the feature recognition engine 130 can be mitigated.

Then, the feature recognition plug-in supplies the material image having a size reduced as necessary to the feature recognition engine 130 (Step 44). The feature recognition engine 130 executes the feature recognition processing on the supplied material image (Step 45). Then, the feature recognition plug-in acquires metadata on a feature area as a result of the feature recognition from the feature recognition engine 130 (Step 46).

(Feature Recognition Processing of Feature Recognition Engine)

Figure 5:
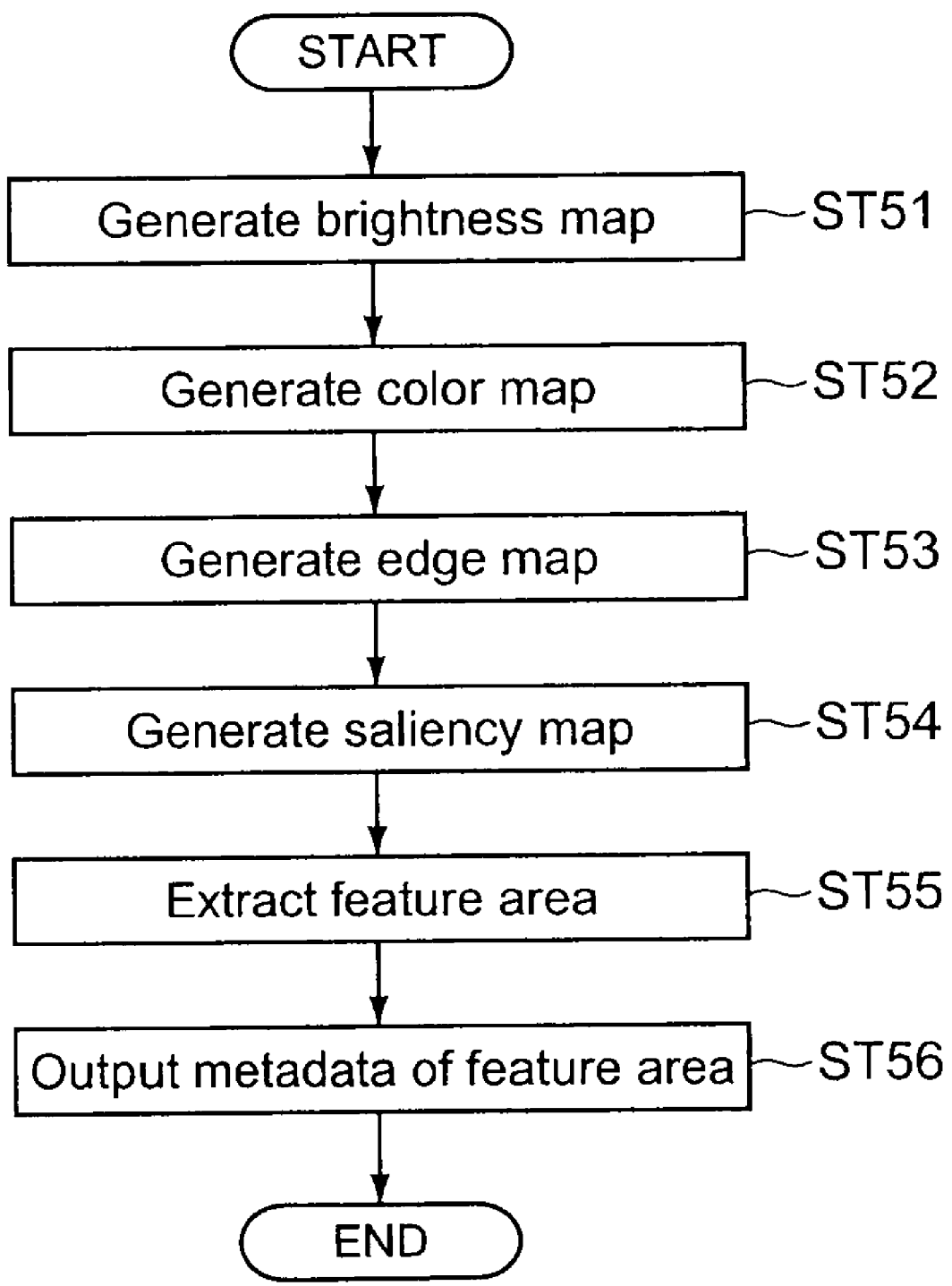
FIG. 5 is a flowchart showing in detail a flow of the feature recognition processing performed by a feature recognition engine in the embodiment of the present invention.

FIG. 5 is a flowchart showing in detail a flow of the feature recognition processing performed by the feature recognition engine 130 in Step 45 described above.

As shown in FIG. 5, the feature recognition engine 130 first generates a brightness map from the supplied material image (Step 51).

Specifically, the feature recognition engine 130 generates a brightness image that has, as pixel values, brightness values of individual pixels of the material image. By using the brightness image, the feature recognition engine 130 then generates a plurality of brightness images each having a different resolution (pyramid images). For example, the pyramid images are generated in accordance with a resolution hierarchy divided into eight resolution levels L1 to L8. The pyramid image of level L1 has the highest resolution, and the resolution is lowered in the ascending order from the level L1 to level L8. A pixel value of one pixel included in a pyramid image of a certain level is set as a mean value of pixel values of four adjacent pixels included in a pyramid image of a level immediately above that level.

Subsequently, the feature recognition engine 130 selects two pyramid images of different levels from the plurality of pyramid images, and obtains a difference between the two pyramid images to generate a difference image regarding brightness. A pixel value of the difference image indicates a difference between brightness values in the pyramid images of different levels, that is, a difference between a brightness of a predetermined pixel in the material image and a mean brightness around the pixel in the material image. Then, the feature recognition engine 130 generates a brightness map based on a predetermined number of difference images thus calculated.

Next, the feature recognition engine 130 generates color maps from the material image (Step 52). The generation of color maps is also basically performed by a similar method as the brightness map.

First, the feature recognition engine 130 generates an RG difference image and a BY difference image. In the RG difference image, differences between R (red) components and G (green) components of pixels in the material image are set as pixel values. In the BY difference image, differences between B (blue) components and Y (yellow) components of pixels in the material image are set as pixel values.

Then, by using the RG difference image, the feature recognition engine 130 generates a plurality of RG difference images each having a different resolution (pyramid images). The feature recognition engine 130 selects two pyramid images of different levels from the plurality of pyramid images, and obtains a difference between the pyramid images to generate a difference image regarding a difference of RG. The same processing is performed on the BY difference image. Thus, the feature recognition engine 130 generates color maps for RG and BY based on the predetermined number of difference images thus calculated.

Next, the feature recognition engine 130 generates edge maps from the material image (Step 53). The generation of edge maps is also basically performed by a similar method as the brightness map and the color maps.

First, the feature recognition engine 130 performs filtering by a Gabor filter on the material image, and generates edge images in which edge intensities in respective directions of, for example, 0 degrees, 45 degrees, 90 degrees, and 135 degrees are set as pixel values.

Then, by using the edge image in each direction, the feature recognition engine 130 generates a plurality of edge images each having a different resolution (pyramid images). Subsequently, the feature recognition engine 130 selects two pyramid images of different levels from the plurality of pyramid images, and obtains a difference between the pyramid images to generate a difference image regarding an edge in each direction. Thus, the feature recognition engine 130 generates edge maps for the respective directions based on the predetermined number of difference images thus calculated.

Then, the feature recognition engine 130 performs linear combination on the brightness maps, color maps, and edge maps that are each generated from the material image, and generates a saliency map. In other words, the feature recognition engine 130 performs weighted addition on information (feature amount) of each area of the brightness maps, color maps, and edge maps for each area at the same position (overlapping area) to thereby generate a saliency map (Step 54).

Here, the weight used in the weighted addition is obtained by neural network learning, for example. Specifically, the feature recognition engine 130 generates a saliency map for a predetermined learning image by the same processing as described above. The feature recognition engine 130 then obtains a weight difference using the weight used in the processing of generating the saliency map and an image label, and adds the weight difference to a weight used in processing of generating a subject map, thereby updating the weight. The image label is a label in which presence/absence of an actual feature (subject) in a learning image on a pixel basis is indicated by 0 and 1. That is, the image label is an ideal saliency map. The feature recognition engine 130 repeats the processing of updating the weight and the processing of generating the saliency map to thus eventually determine an adequate weight.

Based on the saliency map, the feature recognition engine 130 extracts from the material image an area having a high feature amount as a rectangular area (Step 55). Then, the feature recognition engine 130 outputs metadata such as data of the rectangular area, a size thereof, and a feature recognition score to the feature recognition plug-in of the metadata analysis section 21 (Step 56).

(Blur Recognition Processing of Metadata Analysis Section)

Figure 6:
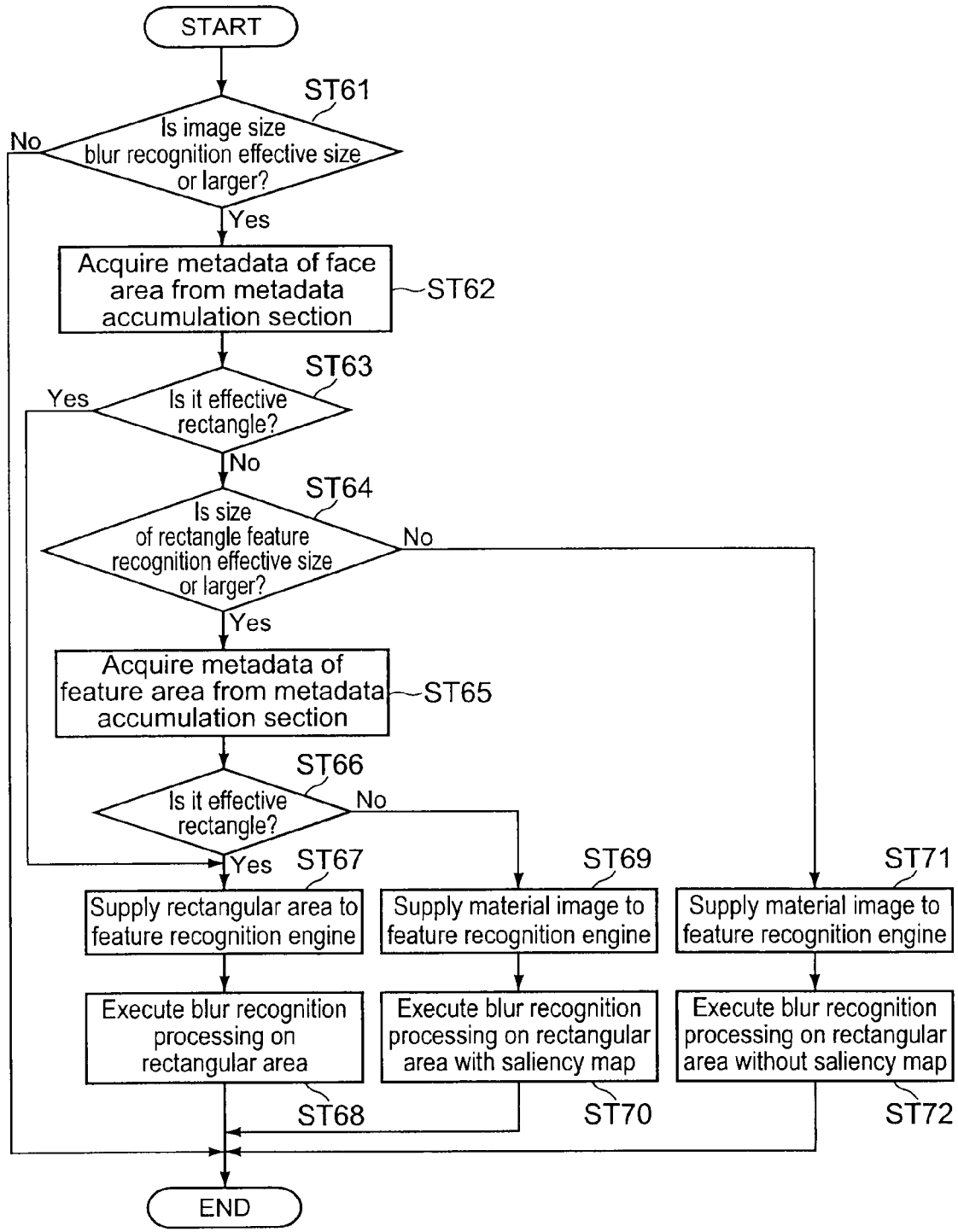
FIG. 6 is a flowchart showing a flow of blur recognition processing in the embodiment of the present invention.

FIG. 6 is a flowchart showing in detail a flow of blur recognition processing in Step 38 described above. As shown in FIG. 6, the feature recognition plug-in first judges whether the size of the material image that is a target of blur recognition is equal to or larger than the minimum effective size in the blur recognition processing by the feature recognition engine 130 (Step 61). The minimum effective size is, for example, 64×64 (pixels), but is not limited thereto. Accordingly, it is judged whether the material image is large enough to tolerate the blur recognition processing. In a case where the size of the material image has been reduced in the feature recognition processing described above, the reduced image is considered as a target image of blur recognition.

In a case where the size of the material image is below the minimum effective size of the blur recognition processing (No), the feature recognition plug-in stops the blur recognition processing of the material image because the material image is assumed as an image in which blur cannot be recognized.

In a case where the size of the material image is equal to or larger than the minimum effective size of the blur recognition processing (Yes), the feature recognition plug-in acquires metadata on a face area from the metadata accumulation section 22 (Step 62). Here, in a case where the size of the material image that is an extraction source of the face area has been reduced in the feature recognition processing, a size of the face area is converted in accordance with an original size of the material image.

Subsequently, the feature recognition plug-in judges whether the face area is an effective rectangle in the blur recognition processing by the feature recognition engine 130 (Step 63). Here, the effective rectangle refers to a rectangle satisfying the minimum effective size of the blur recognition processing by the feature recognition engine 130, or a rectangle in which the number of pixels on short sides thereof is 20% or more the number of pixels on short sides of the material image that is the extraction source of the rectangle.

If the face area is an effective rectangle (Yes), the feature recognition plug-in supplies the face area to the feature recognition engine 130 (Step 67) and causes the feature recognition engine 130 to execute the blur recognition processing on the face area (Step 68). In this case, the blur recognition processing by the feature recognition engine 130 is executed without using the saliency map.

If the face area is not an effective rectangle (No), the feature recognition plug-in judges whether the size of the material image that is the extraction source of the face area is equal to or larger than the minimum effective size (256×256 pixels) of the feature recognition processing by the feature recognition engine 130 (Step 64).

If the size of the material image is equal to or larger than the minimum effective size of the feature recognition processing (Yes), the feature recognition plug-in acquires metadata regarding a feature area from the metadata accumulation section 22 (Step 65). Here, in a case where the size of the material image that is the extraction source of the feature area has been reduced in the feature recognition processing, the size of the feature area is converted in accordance with the original size of the material image.

Subsequently, the feature recognition plug-in judges whether the feature area is an effective rectangle in the blur recognition processing by the feature recognition engine 130 (Step 66). Here, the effective rectangle refers to a rectangle satisfying the minimum effective size of the blur recognition processing by the feature recognition engine 130.

If the feature area is an effective rectangle (Yes), the feature recognition plug-in supplies the feature area to the feature recognition engine 130 (Step 67) and causes the feature recognition engine 130 to execute the blur recognition processing on the feature area (Step 68). In this case, the blur recognition processing by the feature recognition engine 130 is executed using the saliency map.

If the feature area is not an effective rectangle (No), the feature recognition plug-in supplies the material image that is the extraction source of the feature area as a rectangular area to the feature recognition engine 130 (Step 69) and causes the feature recognition engine 130 to execute the blur recognition processing on the material image (Step 70). That is, the blur recognition processing is performed on the entire material image, not in the feature area. The blur recognition processing performed by the feature recognition engine 130 in this case is executed using the saliency map.

In Step 64 above, if the size of the material image is below the minimum effective size of the feature recognition processing (No), the feature recognition plug-in supplies the material image to the feature recognition engine 130 (Step 71) and causes the feature recognition engine 130 to execute the blur recognition processing on the entire material image (Step 72). The blur recognition processing performed by the feature recognition engine 130 in this case is executed without using the saliency map.

(Details of Blur Recognition Processing by Feature Recognition Engine)

Figure 7:
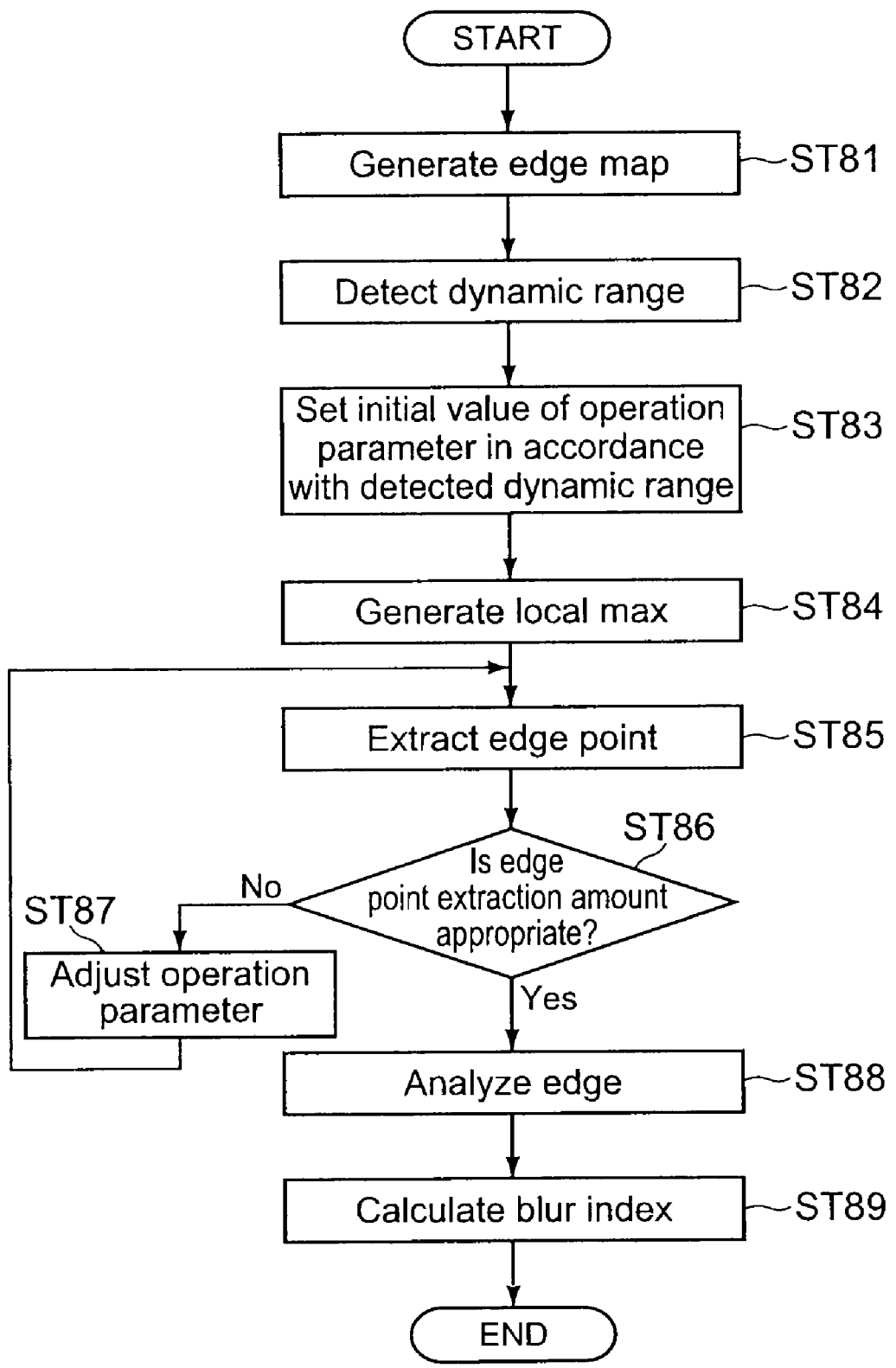
FIG. 7 is a flowchart showing in detail a flow of the blur recognition processing performed by the feature recognition engine in the embodiment of the present invention.

FIG. 7 is a flowchart showing in detail a flow of the blur recognition processing performed by the feature recognition engine 130 in Steps 68, 70, and 72 described above.

As shown in FIG. 7, the feature recognition engine 130 first generates edge maps from the supplied face area, feature area, or material image (Step 81). If the supplied image is a face area, the saliency map is not used for the generation of edge maps. If the supplied image is a feature area, the saliency map is used for the generation of edge maps. Further, if the supplied image is the entire material image, the saliency map is used for the generation of edge maps in a case where the material image has a size that is equal to or larger than the minimum effective size of the feature recognition processing, and the saliency map is not used for the generation of edge maps in a case where the material image has a size below the minimum effective size of the feature recognition processing. Hereinafter, the images including the face area, the feature area, and the entire material image that are supplied from the feature recognition plug-in are collectively referred to as "subject area".

Specifically, the feature recognition engine 130 divides the supplied subject area into blocks each having a size of 2×2 pixels. Then, the feature recognition engine 130 calculates absolute values of differences among pixel values of pixels within each block and calculates a mean value of the absolute values thereafter. The mean value indicates a mean value of edge intensities in vertical, horizontal, and oblique directions within the block. Then, the feature recognition engine 130 arranges the mean values thus calculated in the same order as in corresponding blocks in the subject area, to thereby generate an edge map of a scale SC1. Moreover, the feature recognition engine 130 generates an edge map of a scale SC2 based on an averaging image in which a mean value of the pixel values within the block of the scale SC1 is set as one pixel value. Similarly, the feature recognition engine 130 generates an edge map of a scale SC3 based on an averaging image in which a mean value of pixel values within a block is set as one pixel value, the block being obtained by dividing the averaging image of the scale SC2 into blocks having a size of 2×2 pixels. Thus, in order to suppress variations of edge intensities, the edge maps of different scales are generated on the basis of blocks of different sizes.

Subsequently, the feature recognition engine 130 detects a dynamic range of the subject area using the edge maps (Step 82). Specifically, the feature recognition engine 130 detects a maximum value and a minimum value of pixel values out of the edge maps of the scales SC1 to SC3 described above, and detects a difference between the maximum value and the minimum value as a dynamic range of the edge intensity of the subject area.

After that, the feature recognition engine 130 sets initial values of operation parameters in accordance with the detected dynamic range (Step 83). Here, the operation parameters include an edge reference value and an extraction reference value. The edge reference value is used for judgment of an edge point. The extraction reference value is used to judge whether an edge point extraction amount is appropriate.

In other words, the feature recognition engine 130 divides the subject area into an image of a low dynamic range and an image of a high dynamic range in accordance with whether the dynamic range exceeds a predetermined threshold value, and sets an initial value for an operation parameter of each image. An operation parameter for an image of a low dynamic range is assumed to be smaller than an operation parameter for an image of a high dynamic range. This is because, since the image of a low dynamic range has a smaller number of edges than the image of a high dynamic range and has a smaller amount of extracted edge points, edge points sufficient to maintain an accuracy of the blur recognition are also extracted from the image of a low dynamic range.

Then, the feature recognition engine 130 generates a local max using the generated edge maps (Step 84). Specifically, the feature recognition engine 130 divides the edge map of the scale SC1 into blocks having a size of 2×2 pixels. The feature recognition engine 130 extracts a maximum value of each block of the edge map and arranges the maximum values thus extracted in the same order as in corresponding blocks, to thereby generate a local max LM1 of the scale SC1. That is, the maximum values of pixel values in respective blocks are extracted.

Similarly, the feature recognition engine 130 divides the edge map of the scale SC2 into blocks having a size of 4×4 pixels, extracts a maximum value of each block, and arranges the maximum values thus extracted in the same order as in corresponding blocks. Thus, a local max LM2 of the scale SC2 is generated. In the same manner, the feature recognition engine 130 divides the edge map of the scale SC3 into blocks having a size of 8×8 pixels and generates a local max LM3 of the scale SC3 from the maximum values of respective blocks.

Then, using the local maxes generated above, the feature recognition engine 130 extracts an edge point from the subject area. For the edge point extraction processing, the saliency map is used in accordance with which of a face area and a feature area the subject area is, as described above. Further, in a case where the subject area is the entire material image, the saliency map is used together in accordance with whether the subject area has a size equal to or lager than the minimum effective size of the feature recognition processing.

Specifically, the feature recognition engine 130 selects one pixel within the subject area and sets it as a focus pixel. In a case where the saliency map is used, a focus pixel is selected from a feature area that is highly salient in the subject area and has pixel values equal to or larger than a predetermined value.

Further, the feature recognition engine 130 obtains coordinates $(x1, y1)$ of a pixel of a local max LM1 that corresponds to the focus pixel by the following expression (1), assuming that coordinates of an x-y coordinate system on the subject area including the selected focus pixel are $(x, y)$.

$$(x1, y1)=(x/4, y/4) \quad (1)$$

One pixel of the local max LM1 is generated from the 4×4-pixel blocks of the subject area. Accordingly, coordinates of the pixel of the local max LM1 that corresponds to the focus pixel of the subject area are values that are ¼ the x coordinate and y coordinate of the focus pixel.

Similarly, the feature recognition engine 130 obtains coordinates $(x2, y2)$ of a pixel of a local max LM2 that corresponds to the focus pixel by the following expression (2), and coordinates $(x3, y3)$ of a pixel of a local max LM3 that corresponds to the focus pixel by the following expression (3).

$$(x2, y2)=(x/16, y/16) \quad (2)$$

$$(x3, y3)=(x/64, y/64) \quad (3)$$

In a case where respective pixel values of the coordinates $(x1, y1)$, $(x2, y2)$, and $(x3, y3)$ are equal to or larger than an edge reference value, the feature recognition engine 130 extracts the focus pixel as edge points at the local max LM1, the local max LM2, and the local max LM3 (Step 85). Then, the feature recognition engine 130 stores the coordinates $(x, y)$ of the focus pixel and the pixel values of the coordinates $(x1, y1)$, $(x2, y2)$, and $(x3, y3)$ of the local maxes LM1, LM2, and LM3 in association with each other. The feature recognition engine 130 repeats the above processing until all the pixels within the subject area are considered to be the focus pixel.

Accordingly, based on the local max LM1, a pixel included in a block in which an edge intensity is equal to or larger than an edge reference value, out of the 4×4-pixel blocks of the subject area, is extracted as an edge point.

Similarly, based on the local max LM2, a pixel included in a block in which an edge intensity is equal to or larger than an edge reference value, out of 16×16-pixel blocks of the subject area, is extracted as an edge point. Further, based on the local max LM3, a pixel included in a block in which an edge intensity is equal to or larger than an edge reference value, out of 64×64-pixel blocks of the subject area, is extracted as an edge point.

Accordingly, a pixel included in at least one of the 4×4-pixel blocks, 16×16-pixel blocks, and 64×64-pixel blocks of the subject area in which an edge intensity is equal to or larger than an edge reference value is extracted as an edge point.

The feature recognition engine 130 generates an edge point table ET1 as a table in which coordinates $(x, y)$ of an edge point that is extracted based on the local max LM1 and a pixel value of the local max LM1 that corresponds to the edge point are associated with each other.

Similarly, the feature recognition engine 130 generates an edge point table ET2 in which coordinates $(x, y)$ of an edge point that is extracted based on the local max LM2 and a pixel value of the local max LM2 that corresponds to the edge point are associated with each other. Further, the feature recognition engine 130 also generates an edge point table ET3 in which coordinates $(x, y)$ of an edge point that is extracted based on the local max LM3 and a pixel value of the local max LM3 that corresponds to the edge point are associated with each other.

Then, using the edge point tables ET1 to ET3 generated above, the feature recognition engine 130 judges whether an edge point extraction amount is appropriate (Step 86). For example, in a case where the total number of extracted edge points, that is, the total number of data items of the edge point tables ET1 to ET3 is smaller than the extraction reference value, it is judged that the edge point extraction amount is not appropriate.

When the edge point extraction amount is judged to be inappropriate (No), the feature recognition engine 130 adjusts the operation parameters (Step 87). For example, the feature recognition engine 130 sets the edge reference value to be a predetermined value smaller than a value set at the present time so that a larger number of edge points than at present are extracted. When the operation parameters are adjusted, the processing then returns to Step 85 described above. After that, the above-mentioned processing is repeated until it is judged that the edge point extraction amount is appropriate.

In order to improve the accuracy of the blur recognition through the above processing, as to the image of a low dynamic range, an edge point is also extracted from a block having a low edge intensity so that a sufficient amount of edge points to keep the accuracy of the blur recognition above a certain level can be ensured. On the other hand, as to the image of a high dynamic range, an edge point is extracted from a block having a high edge intensity as much as possible such that an edge point constituting an edge having higher intensity is extracted.

In a case where it is judged that the edge point extraction amount is appropriate (Yes), the feature recognition engine 130 performs an edge analysis using the edge reference value, edge point tables, and local maxes (Step 88).

Specifically, based on the edge point tables ET1 to ET3, the feature recognition engine 130 sets one of the edge points extracted from the subject area as a focus pixel. Then, with coordinates of the x-y coordinate system of the focus pixel as $(x, y)$, the feature recognition engine 130 obtains coordinates $(x1, y1)$ to $(x3, y3)$ of pixels of the local maxes LM1 to LM3 that correspond to the focus pixel by the above-mentioned expressions (1) to (3).

The feature recognition engine 130 sets, to Local Max1 $(x1, y1)$, the maximum value of pixel values of pixels within blocks of the local max LM1 having m×m pixels (for example, 4×4 pixels) in which a pixel of the coordinates $(x1, y1)$ of the local max LM1 is at an upper left-hand corner. Similarly, the feature recognition engine 130 sets, to Local Max2 $(x2, y2)$, the maximum value of pixel values of pixels within blocks of the local max LM2 having n×n pixels (for example, 2×2 pixels) in which a pixel of the coordinates $(x2, y2) of the local max LM2 is at an upper left-hand corner. Further, the feature recognition engine 130 sets a pixel value of the pixel of the coordinates (x3, y3) of the local max LM3 to Local Max3 (x3, y3).

Here, each of parameters (m×m) used for a setting of Local Max1 (x1, y1) and (n×n) used for a setting of Local Max2 (x2, y2) is a parameter for adjusting a difference of sizes of blocks of the subject area, the parameter corresponding to one pixel of the local maxes LM1 to LM3.

The feature recognition engine 130 judges whether Local Max1 (x1, y1), Local Max2 (x2, y2), and Local Max3 (x3, y3) satisfy the following conditional expression (4).

$$\text{Local Max1 } (x1, y1) > \text{edge reference value or}$$

$$\text{Local Max2 } (x2, y2) > \text{edge reference value or}$$

$$\text{Local Max3 } (x3, y3) > \text{edge reference value} \quad (4)$$

In a case where Local Max1 (x1, y1), Local Max2 (x2, y2), and Local Max3 (x3, y3) satisfy the conditional expression (4), the feature recognition engine 130 increments a value of a variable Nedge by one.

An edge point satisfying the conditional expression (4) is presumed to be an edge point that constitutes an edge having an intensity of a certain level or more, irrespective of a structure of the edge point.

Figure 8A:
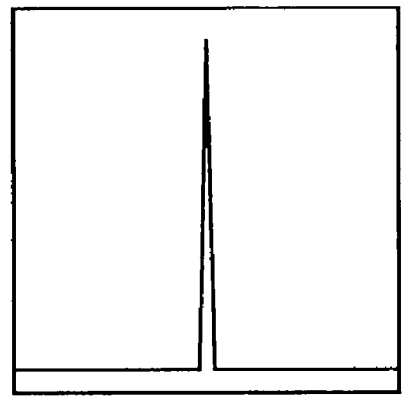
FIGS. 8A to 8D are diagrams for describing types of edges detected in the embodiment of the present invention.
Figure 8B:
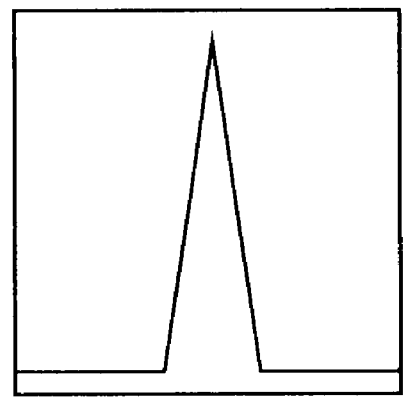
Figure 8C:
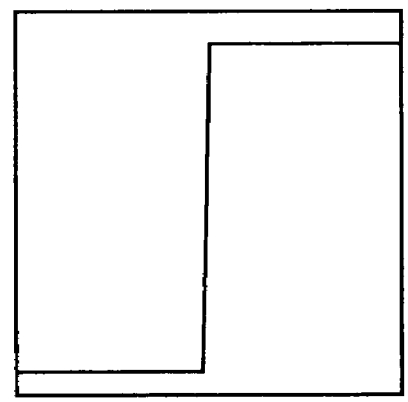
Figure 8D:
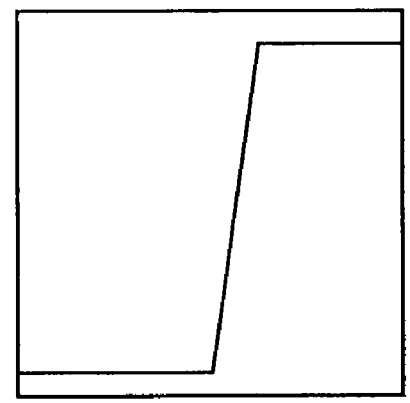

FIGS. 8A to 8D are diagrams for describing types of edges. An edge shown in FIG. 8A is a precipitous impulse-like edge, an edge shown in FIG. 8B is a pulse-like edge having a slope gentler than that of the edge shown in FIG. 8A, an edge shown in FIG. 8C is a stepped edge having a slope that is substantially perpendicular, and an edge shown in FIG. 8D is a stepped edge having a slope gentler than that of the edge shown in FIG. 8C.

When Local Max1 (x1, y1), Local Max2 (x2, y2), and Local Max3 (x3, y3) satisfy the conditional expression (4), the feature recognition engine 130 further judges whether they satisfy the following conditional expression (5) or (6).

$$\text{Local Max1 } (x1, y1) < \text{Local Max2 } (x2, y2) < \text{Local Max3 } (x3, y3) \quad (5)$$

$$\text{Local Max2 } (x2, y2) > \text{Local Max1 } (x1, y1) \text{ and}$$

$$\text{Local Max2 } (x2, y2) > \text{Local Max3 } (x3, y3) \quad (6)$$

When Local Max1 (x1, y1), Local Max2 (x2, y2), and Local Max3 (x3, y3) satisfy the conditional expression (5) or (6), the feature recognition engine 130 increments a value of a variable Nsmallblur by one.

An edge point satisfying the conditional expression (4) and the conditional expression (5) or (6) is presumed to be an edge point that constitutes an edge having a structure of FIGS. 8B or 8D with an intensity of a certain level or more but an intensity lower than that of the edge of FIGS. 8A or 8C.

When Local Max1 (x1, y1), Local Max2 (x2, y2), and Local Max3 (x3, y3) satisfy the conditional expression (4) and the conditional expression (5) or (6), the feature recognition engine 130 further judges whether Local Max1 (x1, y1) satisfies the following conditional expression (7).

$$\text{Local Max1 } (x1, y1) < \text{edge reference value} \quad (7)$$

When Local Max1 (x1, y1) satisfies the conditional expression (7), the feature recognition engine 130 increments a value of a variable Nlargeblur by one.

An edge point satisfying the conditional expression (4), the conditional expression (5) or (6), and the conditional expression (7) is presumed to be an edge point that constitutes an edge in which blur is caused and sharpness is lost, out of the edges having an intensity of a certain level or more and a structure of FIGS. 8B or 8D. In other words, it is presumed that blur is caused at the edge point.

The feature recognition engine 130 repeats the above processing until all edge points extracted from the subject area are the focus pixel. Through the processing, the number of edge points Nedge, the number of edge points Nsmallblur, and the number of edge points Nlargeblur are obtained out of the extracted edge points.

Here, the number Nedge is the number of edge points satisfying the conditional expression (5), and the number Nsmallblur is the number of edge points satisfying the conditional expression (4) and the conditional expression (5) or (6). The number Nlargeblur is the number of edge points satisfying the conditional expression (4), the conditional expression (5) or (6), and the conditional expression (7).

Subsequently, the feature recognition engine 130 uses the calculated number Nsmallblur and number Nlargeblur and calculates the conditional expression (8) to calculate the area blur index that becomes an indicator of a blur degree in the subject area (Step 89).

$$\text{Area blur index} = N\text{largeblur}/N\text{smallblur} \quad (8)$$

That is, the area blur index is a ratio of edge points that are presumed to constitute edges in which blur is caused, to edge points that are presumed to constitute edges having an intensity of a certain level or more and a structure of FIGS. 8B or 8D. Accordingly, it is assumed that, as the area blur index becomes larger, the blur degree of the subject area becomes greater, and as the area blur index becomes smaller, the blur degree of the subject area becomes smaller. The area blur index is calculated as a value ranging from, for example, 0 to 1,000.

The feature recognition engine 130 outputs the calculated area blur index to the feature recognition plug-in and terminates the blur recognition processing.

(Calculation Processing of Image Blur Index by Metadata Analysis Section)

Figures 9, 10:
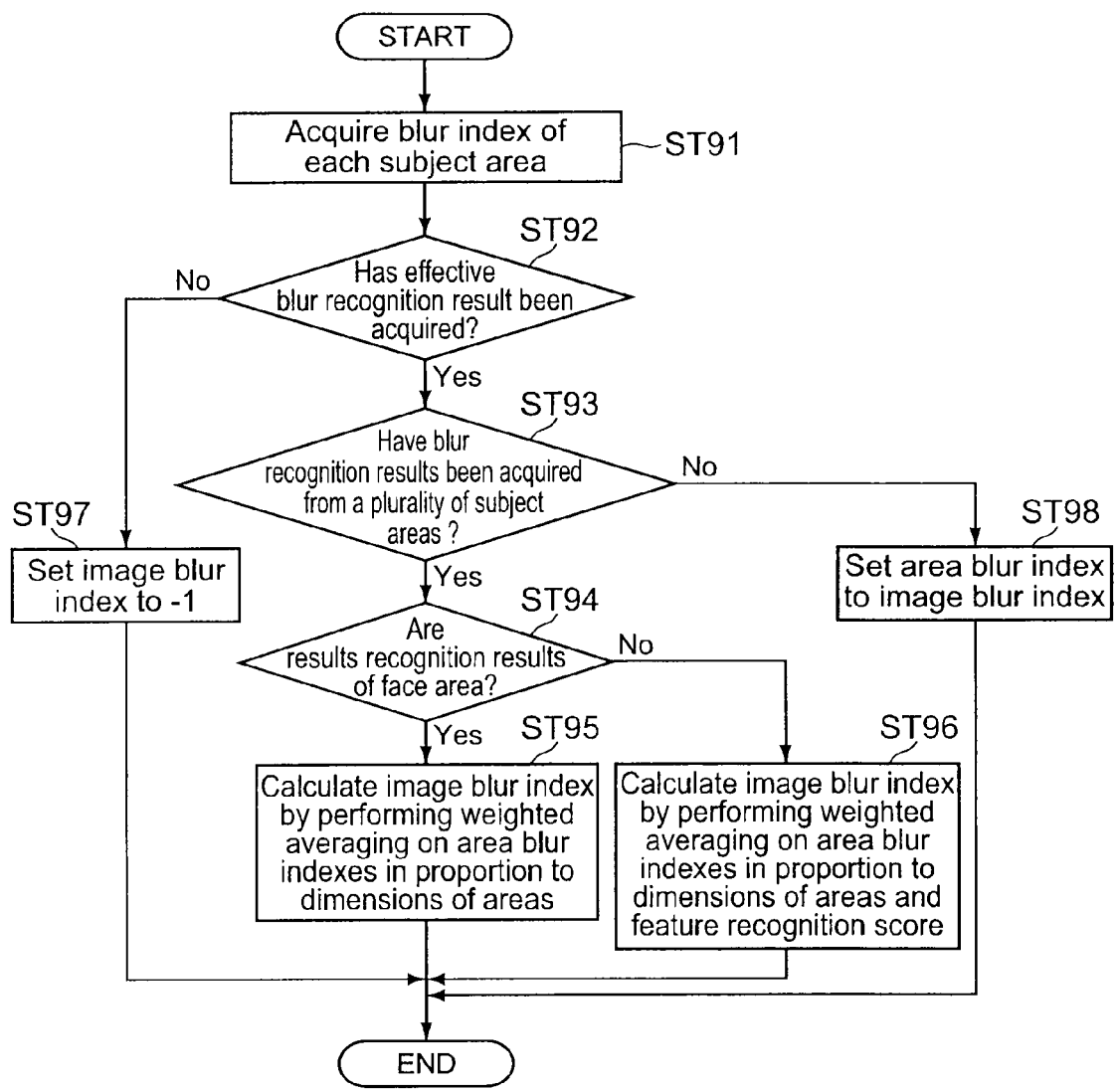
FIG. 9 is a flowchart showing a flow of calculation processing of an image blur index in the embodiment of the present invention.
FIG. 10 is a diagram showing a calculation formula of the image blur index calculated in the embodiment of the present invention.

Next, the feature recognition plug-in of the metadata analysis section 21 calculates an image blur index of the entire image based on area blur indexes of the subject areas that are acquired from the feature recognition engine 130 (Step 38 of FIG. 3). FIG. 9 is a flowchart showing in detail a flow of calculation processing of the image blur index.

As shown in FIG. 9, the feature recognition plug-in acquires area blur indexes of subject areas in a single material image from the feature recognition engine 130 (Step 91), and then judges whether an effective blur recognition result has been acquired (Step 92).

In a case where an effective blur recognition result has not been acquired (No), the feature recognition plug-in sets an image blur index to an invalid value "−1" (Step 97). Here, the case where an effective blur recognition result has not been acquired refers to a case where an area blur index acquired from the feature recognition engine 130 is an abnormal value or a case where a rectangular area is not supplied to the feature recognition engine 130 in the first place as shown in the case (No) of Step 64 in FIG. 6. The image blur index is registered in the metadata accumulation section 22.

In a case where an effective blur recognition result has been acquired (Yes), the feature recognition plug-in judges whether effective blur recognition results have been acquired from a plurality of subject areas of one material image (Step 92).

In a case where an effective blur recognition result has been acquired from only one subject area of one material image (No), the feature recognition plug-in sets the acquired area blur index as an image blur index (Step 98). In this case, the area blur index calculated by the feature recognition engine 130 ranges from 0 to 1,000, while an image blur index is calculated as a value ranging from 0 to 100. Accordingly, the feature recognition plug-in sets, as an image blur index, a value obtained by dividing the area blur index by 10. This image blur index is also registered in the metadata accumulation section 22.

In a case where effective blur recognition results have been acquired from a plurality of subject areas of one material image (Yes), the feature recognition plug-in judges whether the blur recognition results from the subject areas are acquired from a face area or a feature area (Step 94).

In a case where the blur recognition results have been acquired from a plurality of face areas (Yes), the feature recognition plug-in performs weighted averaging on area blur indexes of the face areas in proportion to dimensions of the face areas. As a result, one image blur index with respect to one material image that is a calculation source of the area blur indexes is calculated (Step 95).

In a case where blur recognition results have been acquired from a plurality of feature areas (No), the feature recognition plug-in performs weighted averaging on area blur indexes of the feature areas in proportion to dimensions of the feature areas and feature recognition scores thereof. As a result, one image blur index with respect to one material image that is a calculation source of the feature recognition scores is calculated (Step 96).

FIG. 10 is a diagram showing a calculation formula of the image blur index calculated in Steps 95 and 96 described above.

As shown in FIG. 10, an image blur index is calculated by performing weighted addition on area blur indexes (Bn) of subject areas n in one material image using dimensions (Sn) of the subject areas n and recognition scores (Dn) of the subject areas n as weights, and dividing the resultant by a sum of the weights. When the subject area is a feature area, Dn is an area blur index of the feature area. When the subject area is a face area, Dn is fixed to 1. That is, when the subject area is a face area, weighting in proportion to face recognition scores is not performed. Here, n is a value for identifying a plurality of subject areas that are recognized from one material image. It should be noted that in this calculation formula, the denominator is multiplied by 10 because, as described above, an image blur index calculated from area blur indexes represented in a range of values from 0 to 1,000 is expressed in a range from 0 to 100.

Weighting is performed in proportion to dimensions of respective subject areas because it is considered that, as a dimension of each subject area becomes larger, the subject area is more likely to attract attention of a viewer. Further, as to the face area, weighting is not performed in proportion to face recognition scores. This is because, generally, it is considered that a viewer is highly likely to gaze at a face area unconditionally when recognizing that a subject is a face, irrespective of recognition scores (feature amounts) of the face area. On the other hand, as to the feature area, because the feature recognition plug-in can hardly recognize what the subject of a feature area is and whether the subject is easy to attract attention, weighting is performed in proportion to feature recognition scores in calculating an image blur index.

The calculation processing of the image blur index is started when a material image is taken in the storage section 8 of the PC 100. The calculated image blur index is registered in the metadata accumulation section 22 in association with the material image. In blur image sorting processing described below, sorting of blur images is executed based on the already-calculated image blur index.

(Blur Image Sorting Processing)

Next, blur image sorting processing that is based on an image blur index calculated as described above will be described.

Figure 11:
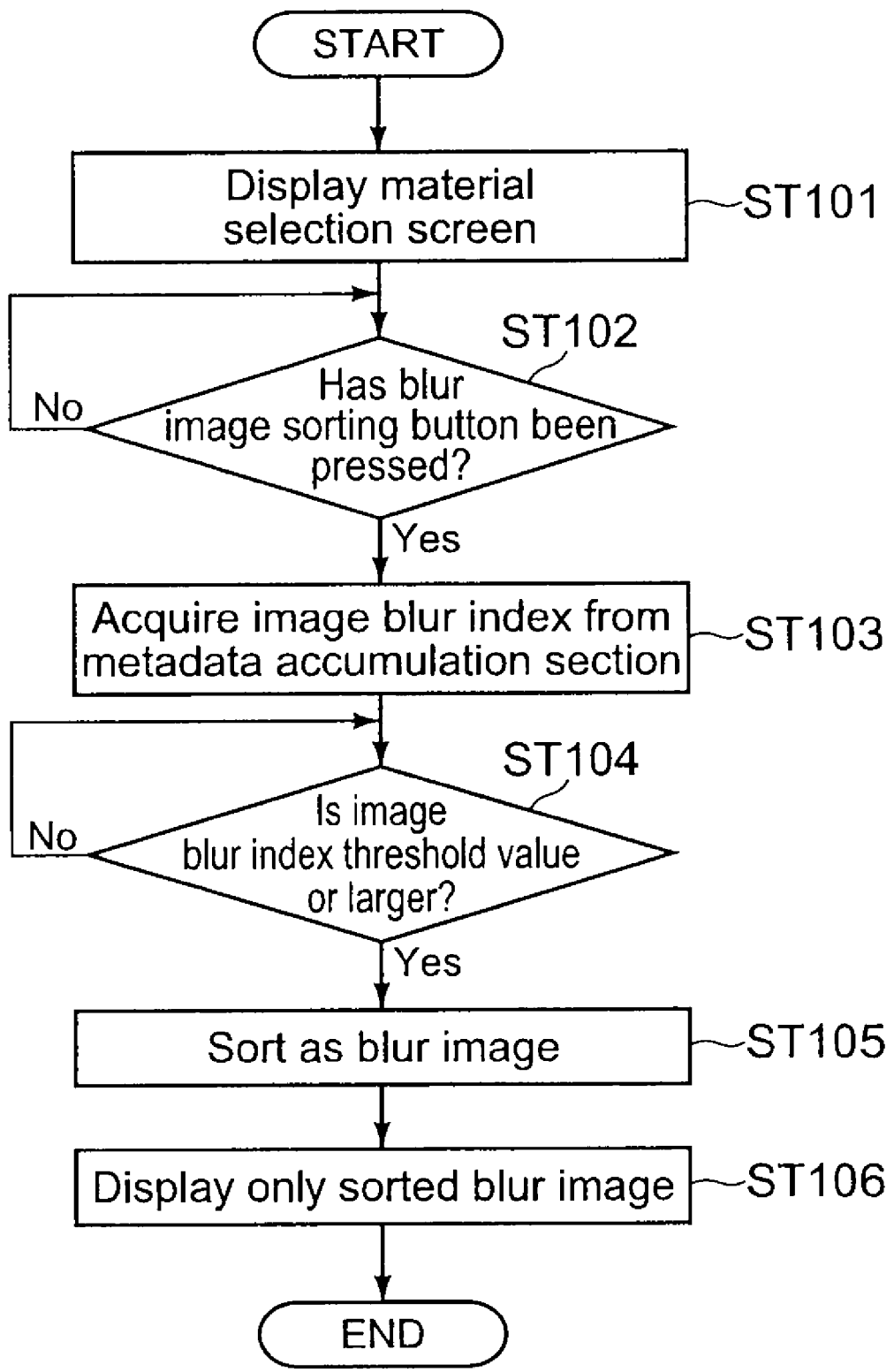
FIG. 11 is a flowchart showing a flow of processing of a blur image sorting section and an image display section in the embodiment of the present invention.

FIG. 11 is a flowchart showing a flow of processing of a blur image sorting section 23 and an image display section 24.

As shown in FIG. 11, the image display section 24 displays a material selection screen for causing a user to select materials of a movie at the beginning of a movie creation step performed by the movie creation application 20 (Step 101).

Figure 12A:
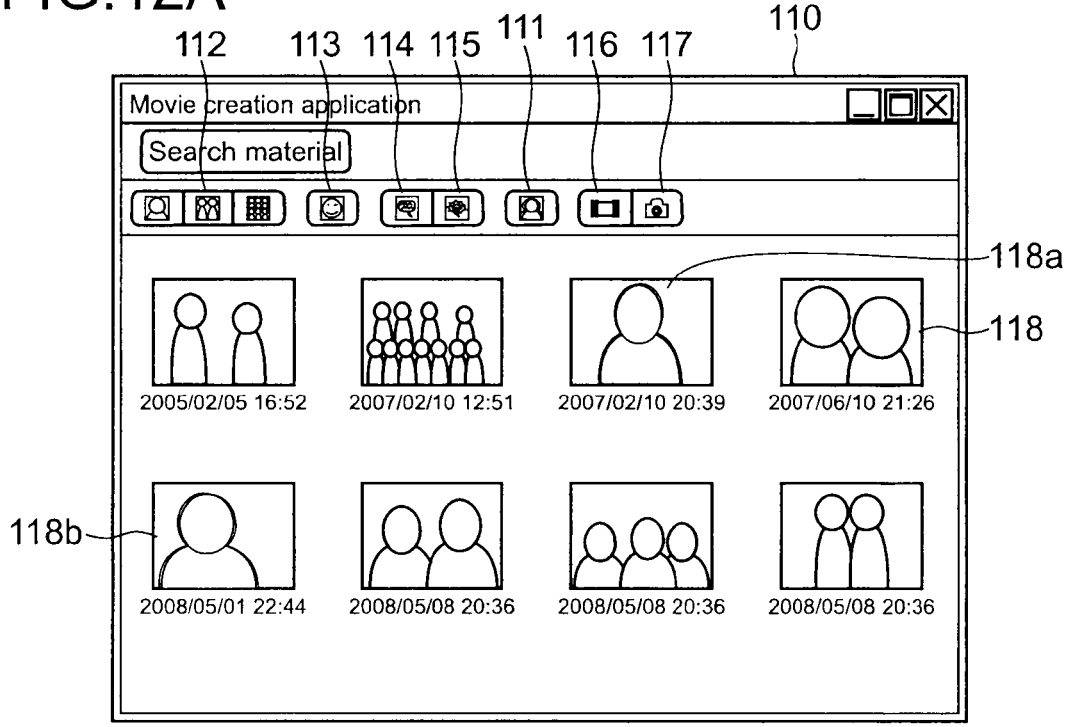
FIGS. 12A and 12B are diagrams showing a material selection screen in the embodiment of the present invention.
Figure 12B:
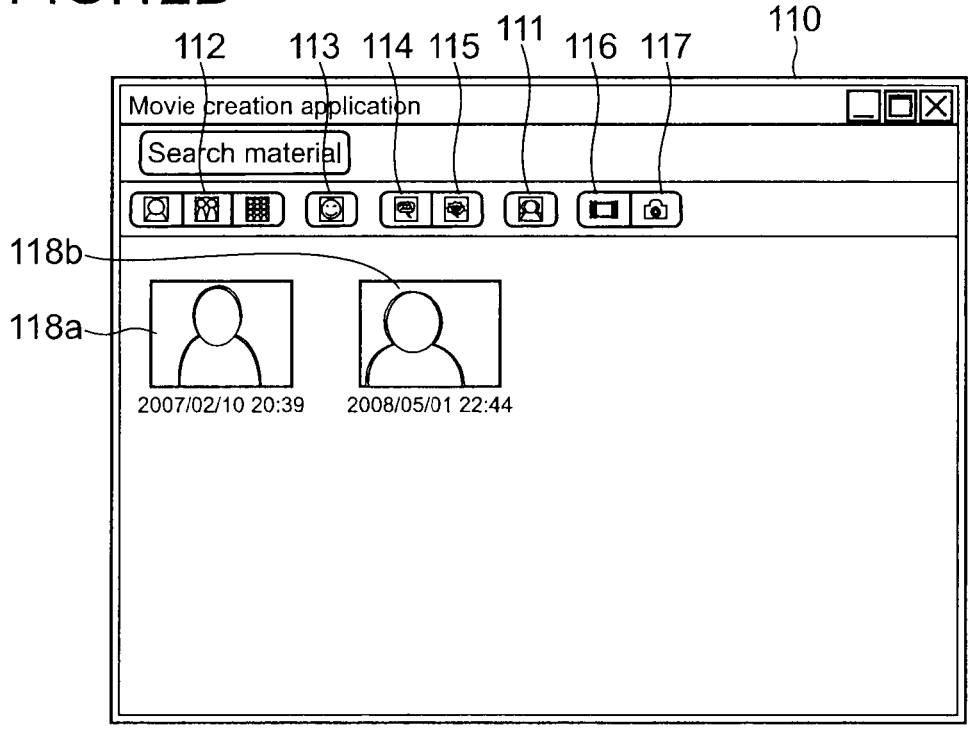

FIGS. 12A and 12B are diagrams showing the material selection screen. As shown in FIGS. 12A and 12B, a material selection screen 110 includes a blur image sorting button 111 for sorting and displaying only blur images from a plurality of still images that are stored in the storage section 8 and can become materials for a movie. The material selection screen 110 further includes a human image sorting button 112, a smile image sorting button 113, a sound image sorting button 114, a voice image sorting button 115, a moving image sorting button 116, and a still image sorting button 117. The human image sorting button 112 is a button for sorting out and displaying only still images with human beings in them in accordance with the number of human beings in the images. The smile image sorting button 113 is a button for sorting out and displaying only still images with smiles of human beings in them. The sound image sorting button 114 is a button for sorting out and displaying only moving images including sounds other than human voices. The voice image sorting button 115 is a button for sorting out and displaying only moving images including human voices. The moving image sorting button 116 and the still image sorting button 117 are buttons for sorting out and displaying only moving images or still images out of a plurality of materials (moving images and still images). FIG. 12A shows a case where a list of only still images 118 is displayed by the still image sorting button 117. Out of a plurality of still images 118 displayed, still images 118a and 118b are blur images.

Returning to FIG. 11, the blur image sorting section 23 judges whether a user has pressed the blur image sorting button 111 (Step 102). When it is judged that the blur image sorting button ill has been pressed (Yes), the blur image sorting section 23 acquires the image blur index described above of each still image from the metadata accumulation section 22 (Step 103).

Subsequently, the blur image sorting section 23 judges whether the acquired image blur index is equal to or larger than a predetermined threshold value with respect to the plurality of still images one by one (Step 104). The predetermined threshold value is 60, for example, but is not limited thereto.

When an image blur index of a still image is less than the threshold value (No), the blur image sorting section 23 executes judgment on the next still image.

When an image blur index of a still image is equal to or larger than the threshold value (Yes), the blur image sorting section 23 sorts the still image as a blur image and instructs the image display section 24 to display only the sorted blur image (Step 105).

Then, in accordance with the instruction from the blur image sorting section 23, the image display section 24 switches display so as to display only the blur image out of the plurality of still images that have been displayed so far (Step 106).

FIG. 12B shows a state where only blur images are sorted out by the blur image sorting button 111 being pressed. As shown in FIG. 12B, of the still images 118 displayed in FIG. 12A, only the blur images 118a and 118b are sorted out and displayed.

The user can remove the blur images 118a and 118b that have been sorted out and displayed from the materials for the movie by deleting them or storing them in another storage area different from other still images. That is, the user can grasp unnecessary blur images instantly only by pressing the blur image sorting button 111 on the material selection screen 110.

(Conclusion)

As described above, in this embodiment, the PC 100 can calculate one image blur index for one material image based on an area blur index or area blur indexes of one or a plurality of subject areas (face areas or feature areas) within a material image. In a case where effective area blur indexes are calculated from a plurality of subject areas within a material image, the respective area blur indexes are subjected to weighted averaging in proportion to dimensions (and recognition scores) of the subject areas, to thus calculate an image blur index. Then, when the blur image sorting button 111 is pressed on the material selection screen 110, only blur images are sorted out and displayed based on the image blur index. Accordingly, the PC 100 distinguishes subject areas in a material image that are more likely to attract attention of viewers and, in addition, processes the subject areas such that a blur index of the entire image becomes higher as the subject areas that are likely to attract attention become more blurry, with the result that blur images can be sorted out more accurately.

(Modification)

The present invention is not limited to only the embodiment described above, and various modifications can be made without departing from the gist of the present invention.

In the embodiment described above, when the blur image sorting button 111 is pressed on the material selection screen 110 and blur images are sorted out and displayed thereon, a user makes various processing such as delete as appropriate. However, at a time when material images are taken in the PC 100, the movie creation application 20 may execute the calculation processing of an image blur index and the sorting processing of blur images and delete the blur images automatically. Moreover, in this case, the movie creation application 20 may display for a user a confirmation message, for example, "Taken-in images include blur images. Delete blur images?", and delete the blur images in accordance with instructions of the user. When material images are taken in, the movie creation application 20 may execute sorting processing of blur images, and as to the blur images, stop taking them in into the PC 100. Also in this case, a message for confirming the stop of taking in the blur images with the user may be displayed. Furthermore, the movie creation application 20 may execute sorting processing of blur images regularly, for example, once a day or once a week, instead of a time at which material images are taken in, and automatically delete the blur images in accordance with the instructions of the user.

In the embodiment described above, the feature recognition engine 130 extracts feature areas from an image by generating a saliency map. However, the extraction of feature areas is not limited to the case where the saliency map is used. For example, an object that is present on a line dividing an image at a so-called golden ratio may be detected as a subject.

In the embodiment described above, the feature recognition engine 130 generates the saliency map based on the brightness map, the color map, and the edge map. However, the saliency map may also be generated based on a map regarding other features, for example, a motion vector map that is generated from features on motion vectors of continuous images.

In the embodiment described above, the movie creation application 20 executes the blur images sorting from a plurality of still images. However, the movie creation application 20 can also sort blur images from a plurality of moving images in a similar manner. In this case, the movie creation application 20 can sort out videos containing blur images as blur videos by processing frames that constitute a plurality of moving images as the above-mentioned still images. In this case, of all frames, moving images including blur images of a predetermined frame ratio or more may be sorted out as blur images.

In the embodiment described above, the blur image sorting function has been described as the function of the movie creation application. However, an application other than the movie creation application may include the blur image sorting function described above, or a general-purpose application having only the blur image sorting function may exist independently. In this case, the face recognition engine 120 and the feature recognition engine 130 may be present as external engines separate from an application having the blur image sorting function, or may be present as internal engines.

In the embodiment described above, the blur image sorting is executed on still images stored in the storage section 8 as a local storage section of the PC 100. However, the PC 100 may execute blur image sorting processing on still images stored in a storage section on a network connected via the communication section 9.

In the embodiment described above, the respective processing in the blur image sorting processing are executed by software. However, the respective processing including the face recognition processing, the feature recognition processing, the blur recognition processing, and the blur image sorting processing may be executed by various hardware such as a circuit board that carries out those processing.

In the embodiment described above, a PC is exemplified as the electronic apparatus. However, the present invention can be applied to other electronic apparatuses including a television apparatus, a recording/reproducing apparatus that uses a recording medium such as an HDD (Hard Disk Drive), a DVD, and a BD (Blu-ray Disc), a digital still camera, a digital video camera, a portable AV apparatus, a cellular phone, and a game apparatus in the same manner.

The present application contains subject matter related to that disclosed in Japanese Priority Patent Application JP 2008-244816 filed in the Japan Patent Office on Sep. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   an extraction means for extracting, from an image, a subject area having a predetermined feature in the image;
   a first calculation means for calculating a first blur degree that indicates a blur degree of the extracted subject area;
   a second calculation means for calculating, when the number of subject areas in the image from which the first blur degree is calculated is one, a second blur degree that indicates a blur degree of the entire image based on the first blur degree, and calculating, when the number of subject areas in the image from which the first blur degree is calculated is plural, the second blur degree based on a value obtained by performing weighted averaging on the plurality of first blur degrees in accordance with dimensions of the plurality of subject areas; and a sorting means for sorting an image having the calculated second blur degree that is equal to or larger than a predetermined threshold value, as a blur image, from a plurality of images.

2. The electronic apparatus according to claim 1, further comprising an optimization means for optimizing the extracted subject area so that the extracted subject area will have a predetermined size adequate to a calculation of the first blur degree.

3. The electronic apparatus according to claim 2, wherein the extraction means calculates a score that indicates a certainty of extraction of the subject area, and wherein the second calculation means calculates, when the number of subject areas in the image from which the first blur degree is calculated is plural, the second blur degree based on a value obtained by performing weighted averaging on the plurality of first blur degrees in accordance with the dimensions of the plurality of subject areas and the calculated score.

4. The electronic apparatus according to claim 3, wherein the extraction means includes a face recognition means for recognizing a face area of a human face as the subject area and calculating a first score that indicates the score of the recognized face area, and a feature recognition means for recognizing a feature area that is visually salient as the subject area and calculating a second score that indicates the score of the recognized feature area, and wherein, in a case where the number of subject areas in the image from which the first blur degree is calculated is plural, the second calculation means calculates the second blur degree without using the first score in the weighted averaging when the face area is recognized as the subject area by the face recognition means, and calculates the second blur degree using the second score in the weighted averaging when the feature area is recognized as the subject area by the feature recognition means.

5. The electronic apparatus according to claim 2, wherein the first calculation means calculates the first blur degree with the entire image as the subject area when no subject area is extracted.

6. The electronic apparatus according to claim 2, further comprising:

an operation reception means for receiving an operation of a user; and a display means for displaying the plurality of images, wherein the sorting means sorts out the blur image in accordance with a predetermined operation of the user, and wherein the display means displays only the sorted blur image out of the plurality of displayed images when the predetermined operation is received.

7. A blur image sorting method, comprising:

extracting, from an image, a subject area having a predetermined feature in the image;

calculating a first blur degree that indicates a blur degree of the extracted subject area;

calculating, when the number of subject areas in the image from which the first blur degree is calculated is one, a second blur degree that indicates a blur degree of the entire image based on the first blur degree, and calculating, when the number of subject areas in the image from which the first blur degree is calculated is plural, the second blur degree based on a value obtained by performing weighted averaging on the plurality of first blur degrees in accordance with dimensions of the plurality of subject areas; and sorting an image having the calculated second blur degree that is equal to or larger than a predetermined threshold value, as a blur image, from a plurality of images.

8. A blur image sorting method, comprising:

optimizing a subject area having a predetermined feature, that is extracted from an image so that the subject area will have a predetermined size;

acquiring a first blur degree that is calculated from the optimized subject area and indicates a blur degree of the subject area;

calculating, when the number of subject areas in the image from which the first blur degree is calculated is one, a second blur degree that indicates a blur degree of the entire image based on the first blur degree, and calculating, when the number of subject areas in the image from which the first blur degree is calculated is plural, the second blur degree based on a value obtained by performing weighted averaging on the plurality of first blur degrees in accordance with dimensions of the plurality of subject areas; and sorting an image having the calculated second blur degree that is equal to or larger than a predetermined threshold value, as a blur image, from a plurality of images.

9. A non-transitory computer readable media having computer readable instructions stored thereon that when executed by a processing circuit causes an electronic apparatus to perform a method comprising:

extracting, from an image, a subject area having a predetermined feature in the image;

calculating a first blur degree that indicates a blur degree of the extracted subject area;

calculating, when the number of subject areas in the image from which the first blur degree is calculated is one, a second blur degree that indicates a blur degree of the entire image based on the first blur degree, and calculating, when the number of subject areas in the image from which the first blur degree is calculated is plural, the second blur degree based on a value obtained by performing weighted averaging on the plurality of first blur degrees in accordance with dimensions of the plurality of subject areas; and sorting an image having the calculated second blur degree that is equal to or larger than a predetermined threshold value, as a blur image, from a plurality of images.

10. A non-transitory computer readable media having computer readable instructions stored thereon that when executed by a processing circuit causes an electronic apparatus to perform a method comprising:

optimizing a subject area having a predetermined feature, that is extracted from an image so that the subject area will have a predetermined size;

acquiring a first blur degree that is calculated from the optimized subject area and indicates a blur degree of the subject area;

calculating, when the number of subject areas in the image from which the first blur degree is calculated is one, a second blur degree that indicates a blur degree of the entire image based on the first blur degree, and calculating, when the number of subject areas in the image from which the first blur degree is calculated is plural, the second blur degree based on a value obtained by performing weighted averaging on the plurality of first blur degrees in accordance with dimensions of the plurality of subject areas; and sorting an image having the calculated second blur degree that is equal to or larger than a predetermined threshold value, as a blur image, from a plurality of images.

11. An electronic apparatus, comprising:

an extraction section to extract, from an image, a subject area having a predetermined feature in the image;

a processing circuit that implements a first calculation section to calculate a first blur degree that indicates a blur degree of the extracted subject area;

a second calculation section to calculate, when the number of subject areas in the image from which the first blur degree is calculated is one, a second blur degree that indicates a blur degree of the entire image based on the first blur degree, and calculate, when the number of subject areas in the image from which the first blur degree is calculated is plural, the second blur degree based on a value obtained by performing weighted averaging on the plurality of first blur degrees in accordance with dimensions of the plurality of subject areas; and a sorting section to sort an image having the calculated second blur degree that is equal to or larger than a predetermined threshold value, as a blur image, from a plurality of images.

* * * * *